Aug. 18, 1953  H. G. TASKER ET AL  2,649,581
SINGLE SCOPE TWO-COORDINATE RADAR SYSTEM
Filed Sept. 29, 1947  10 Sheets-Sheet 1

SIMPLIFIED
SHOWING ON
AZIMUTH
TUBE
SCREEN

AZIMUTH SHOWING
WITH SUPERPOSED
AZIMUTH MAP &
FLIGHT TAB.

Inventors
Homer G. Tasker
Alvin L. Hiebert
Alwyn L. Kelsey
William E. Osborne
Buckley & Beaufleberry
Attys

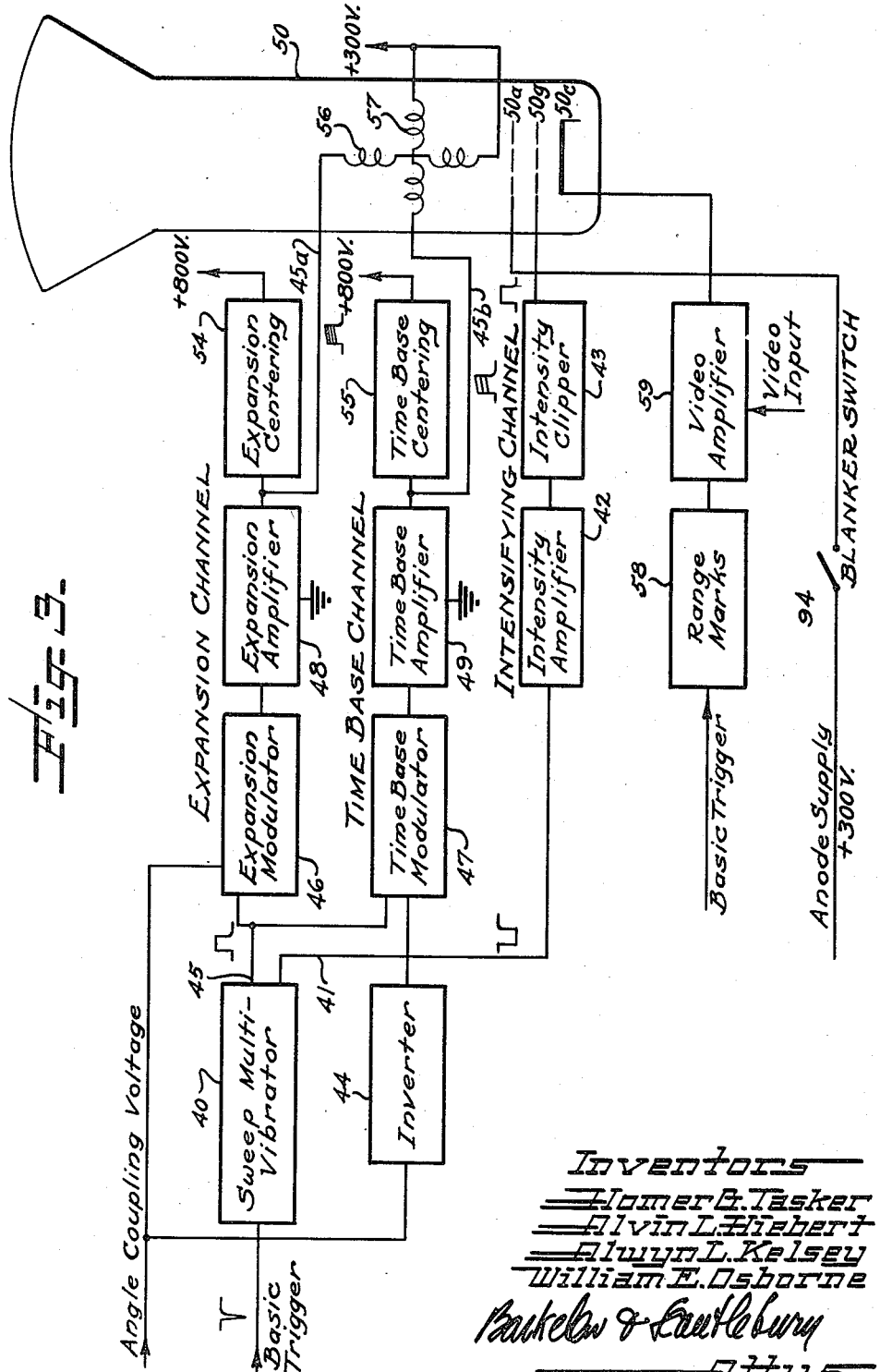

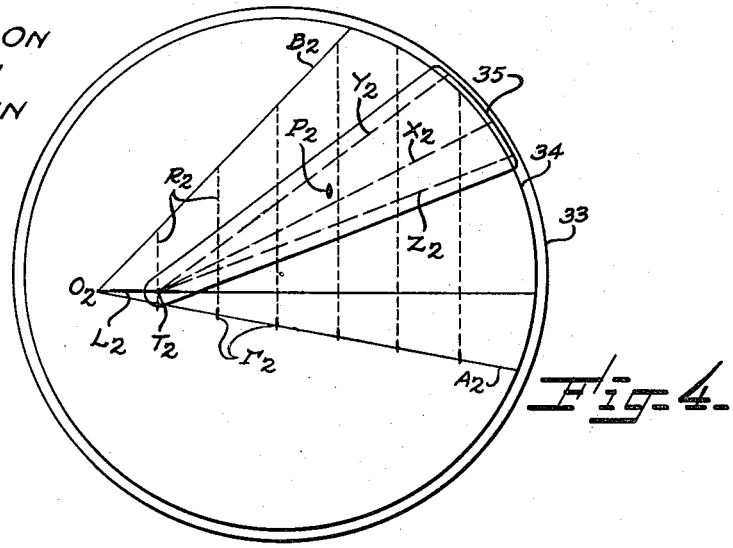
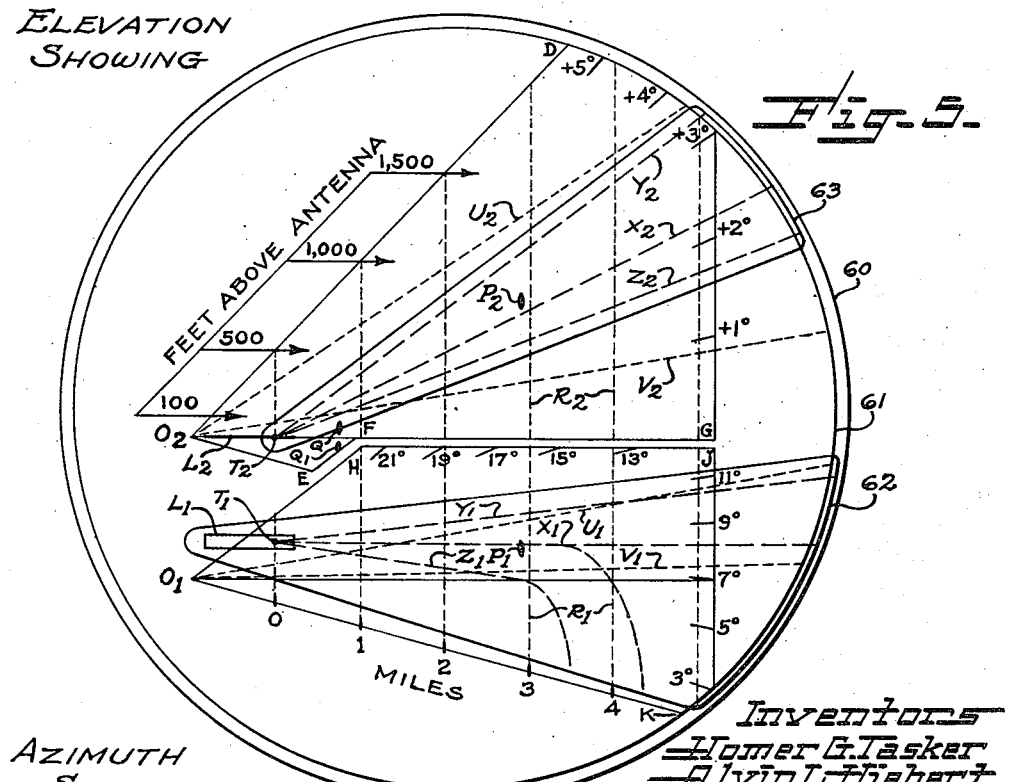

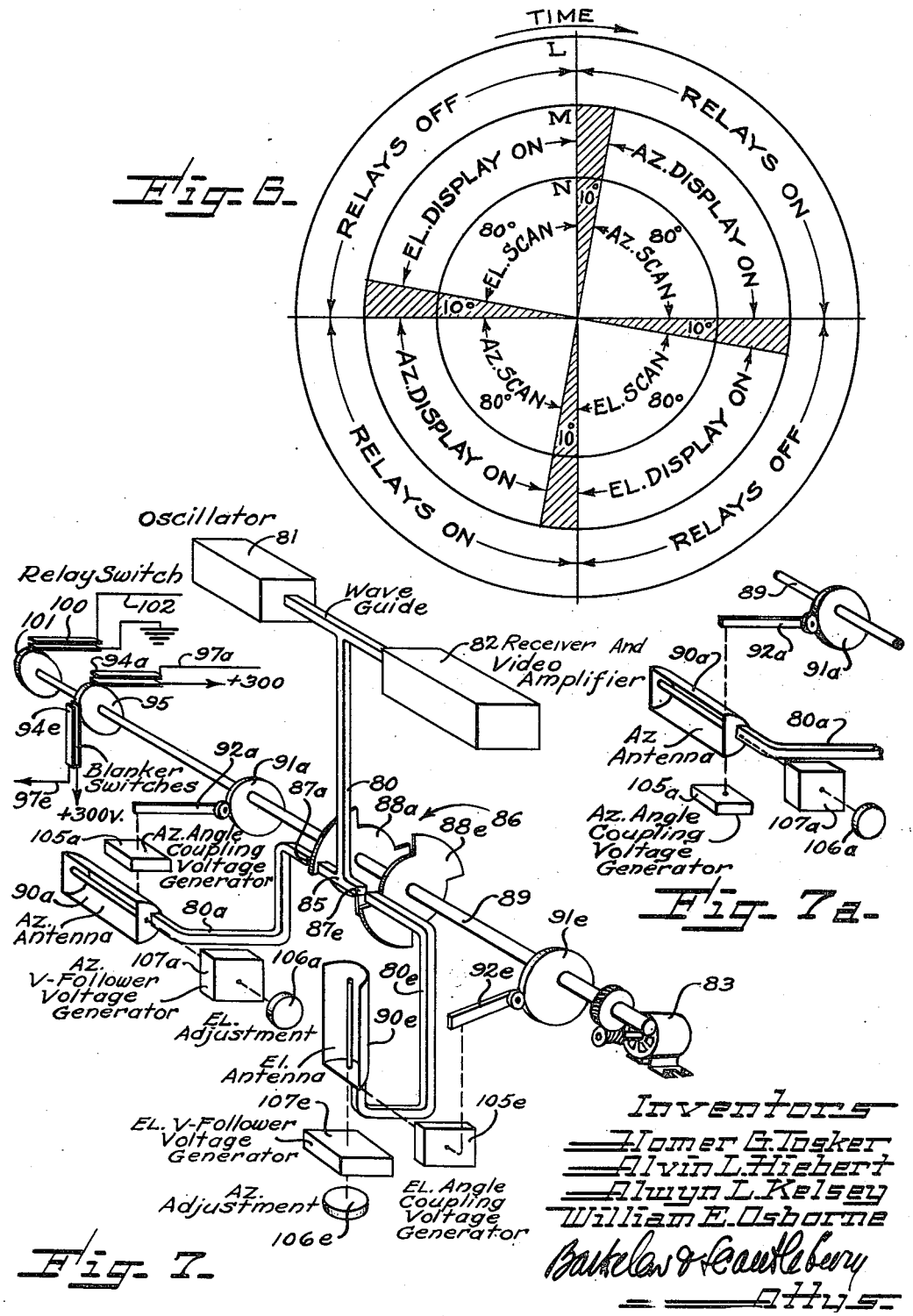

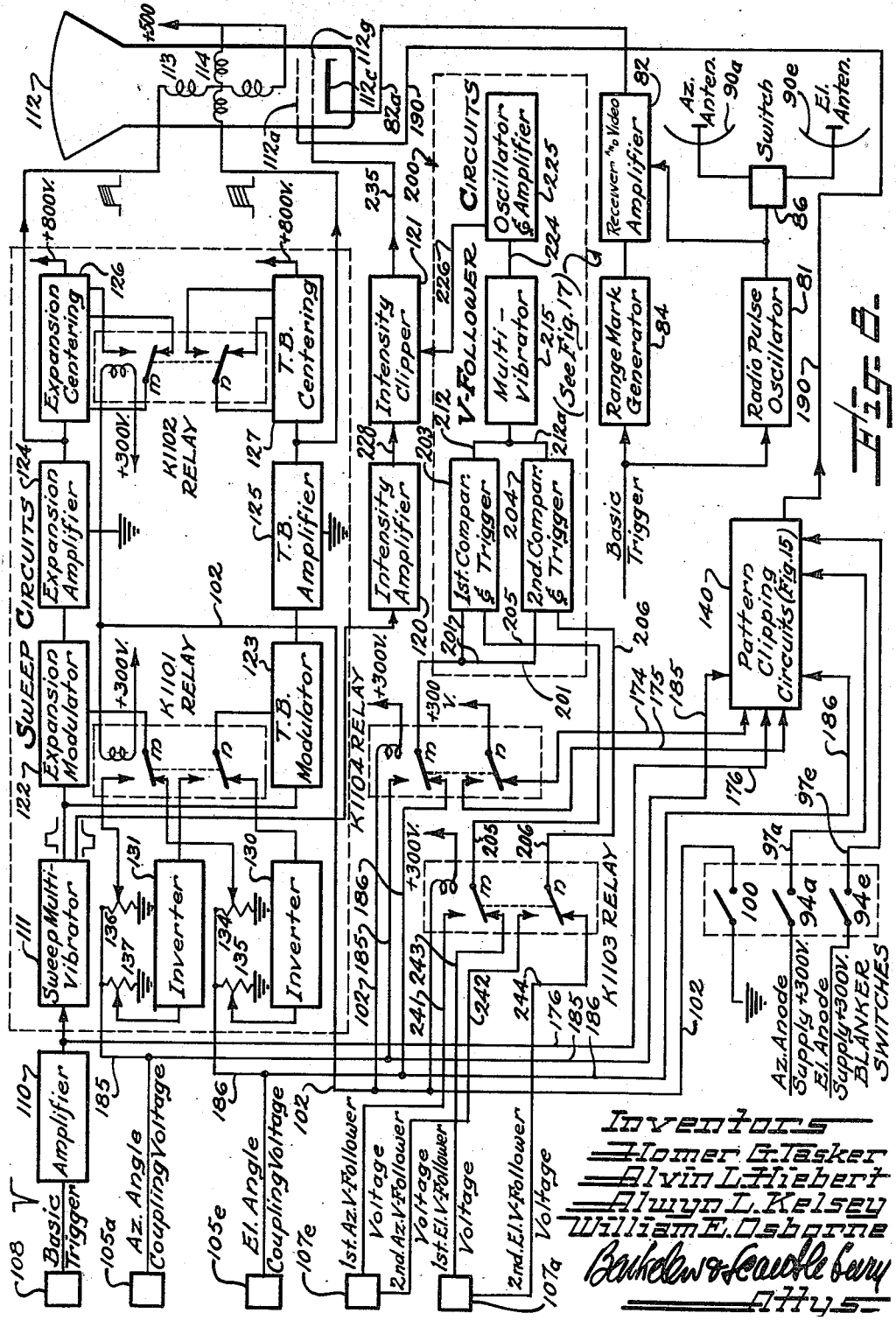

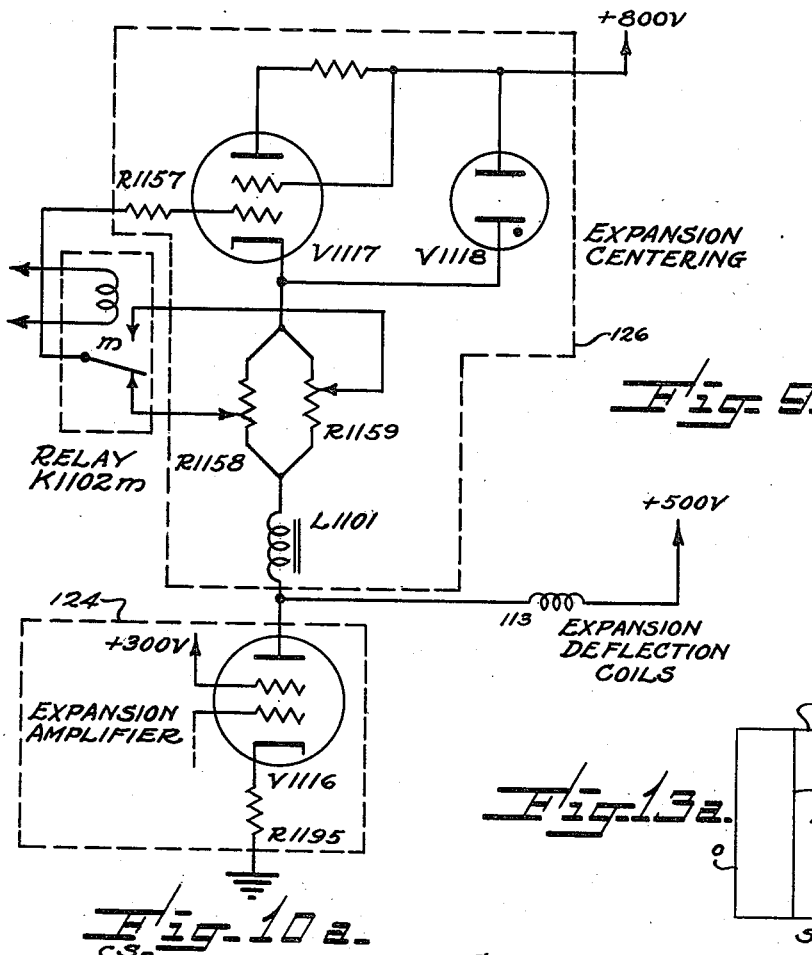
Fig. 9.
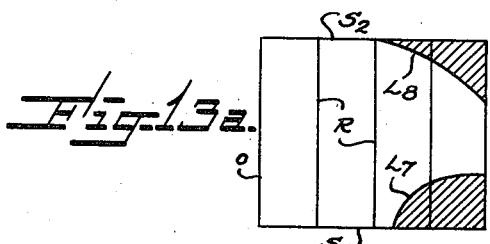
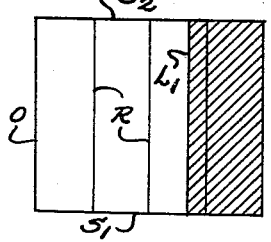
Fig. 10a.
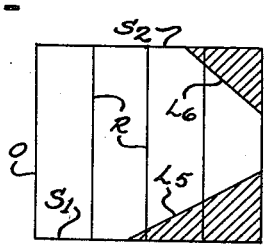
Fig. 12a.
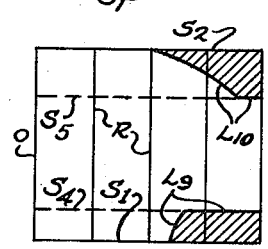
Fig. 14a.
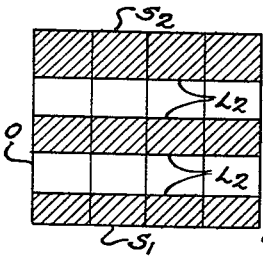
Fig. 11a.

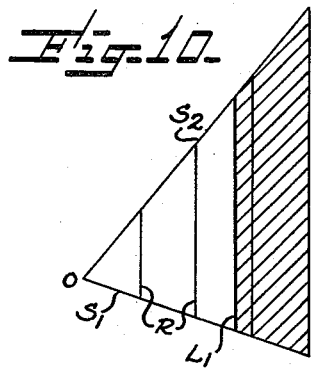
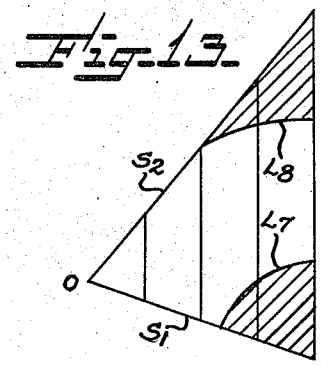
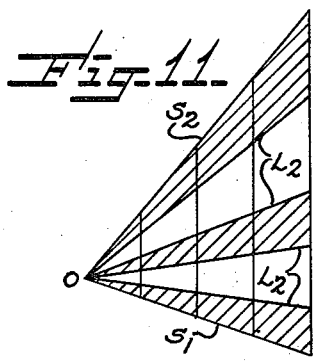
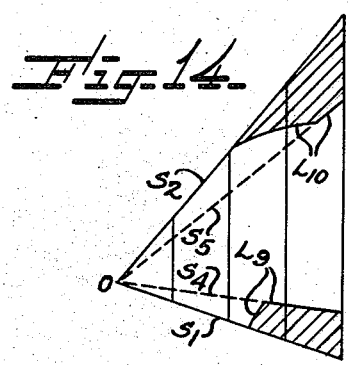
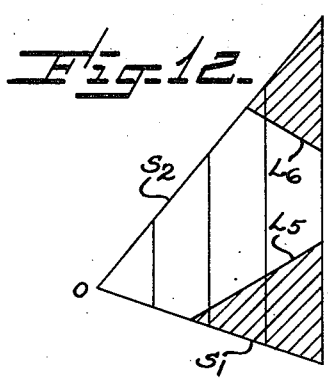
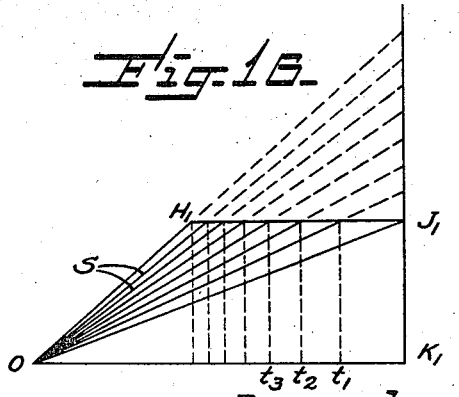

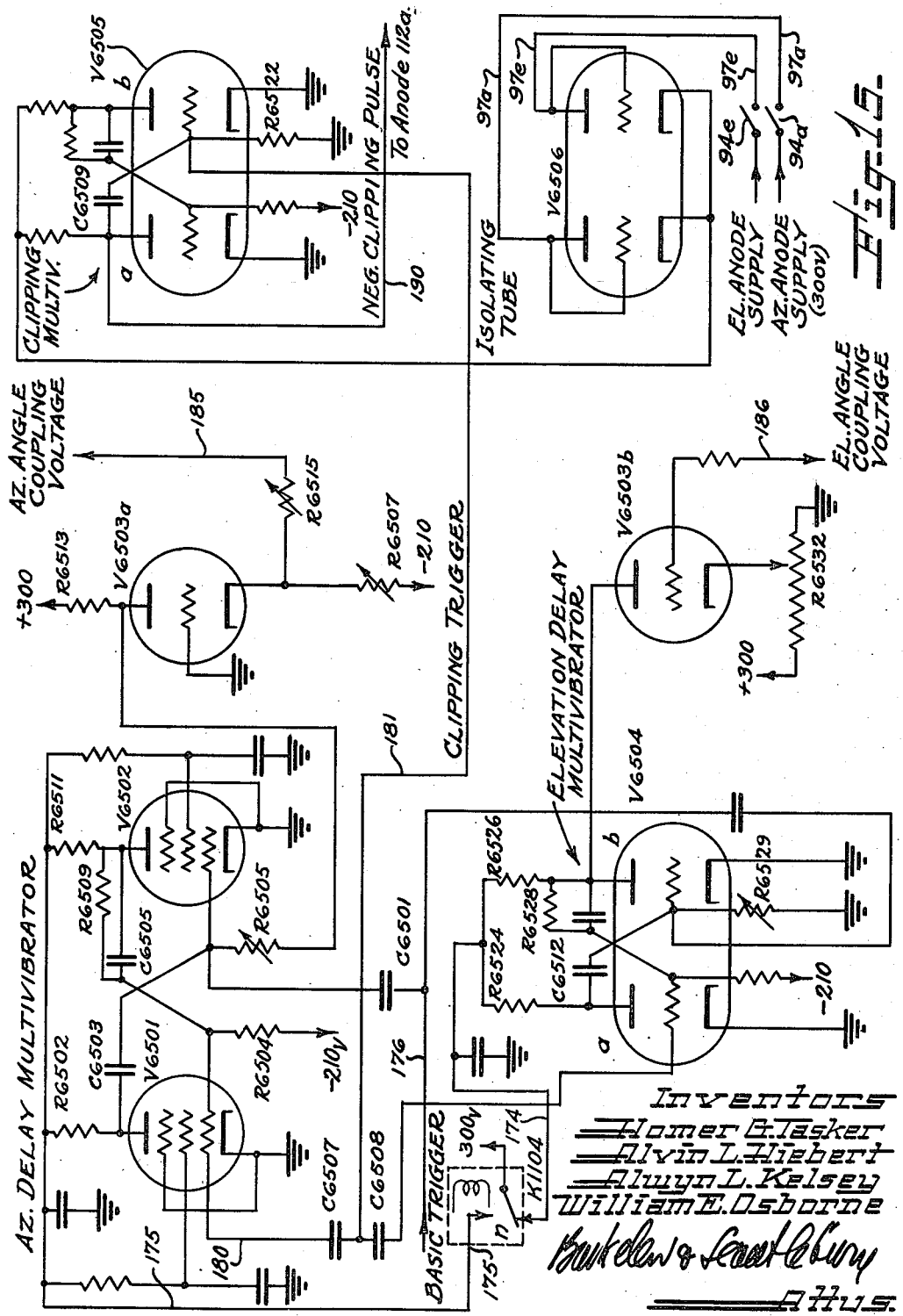

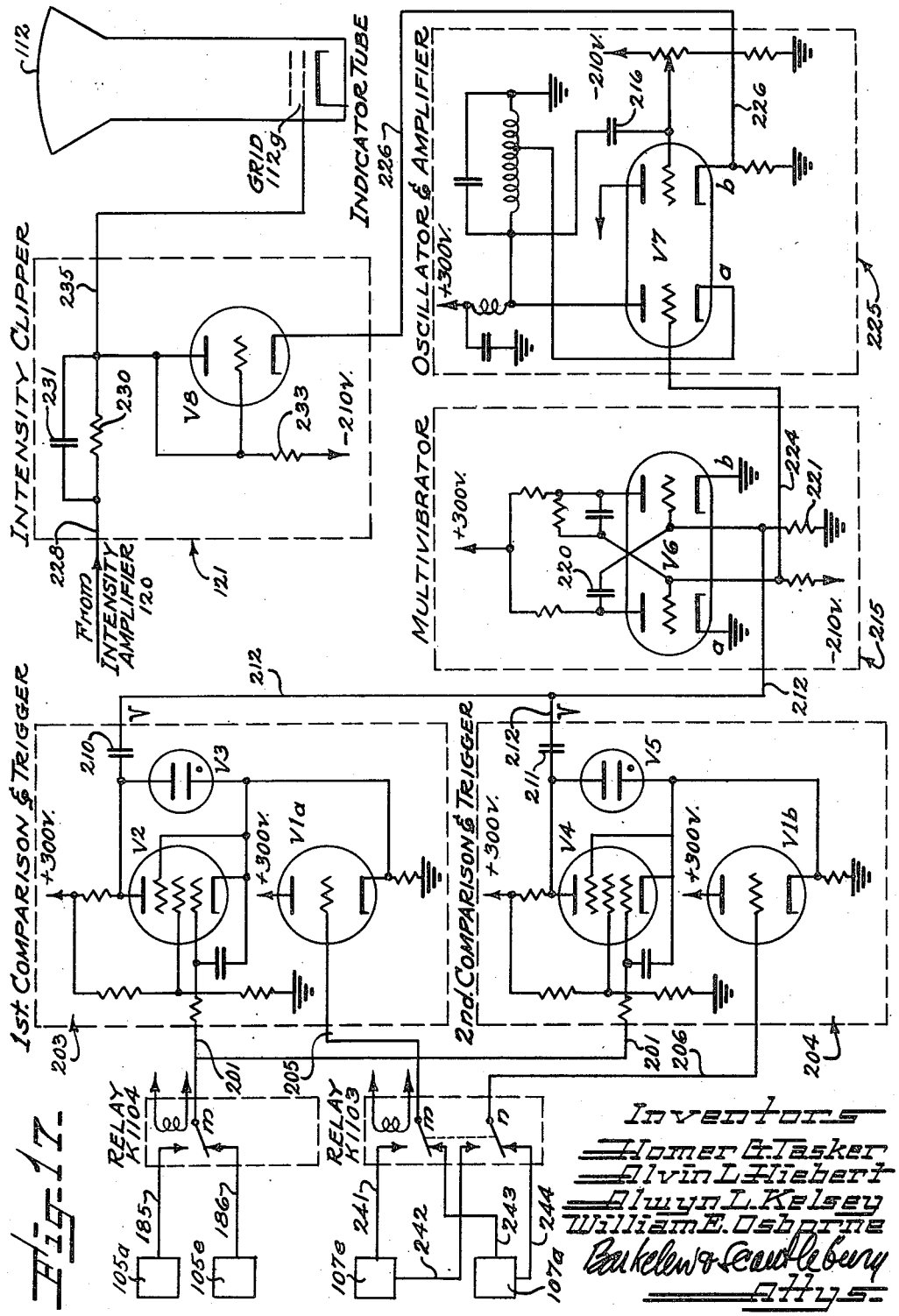

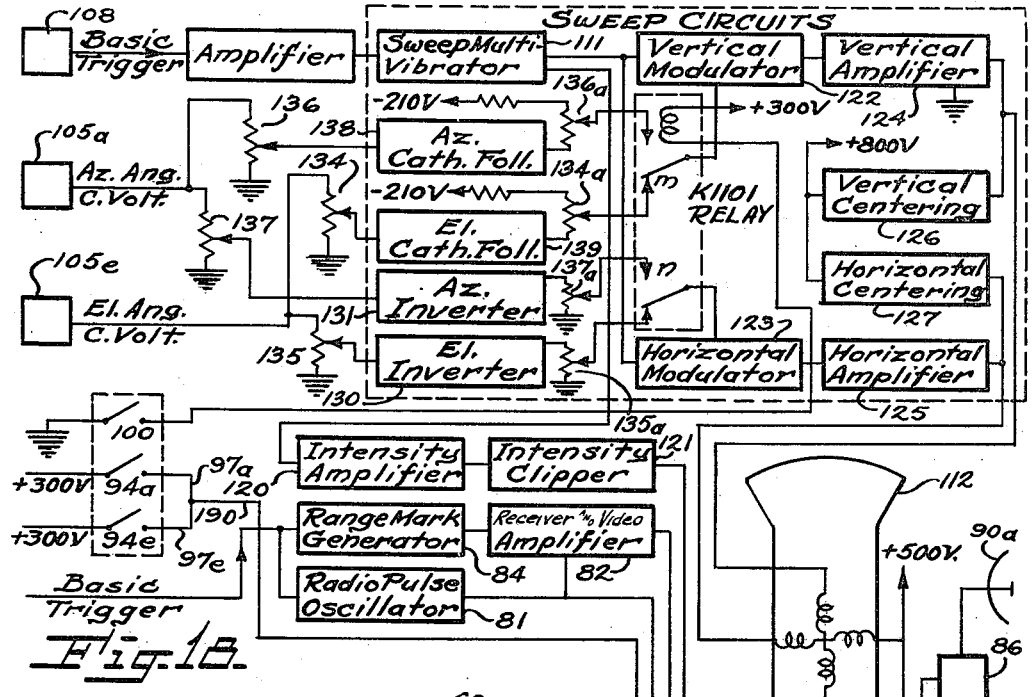
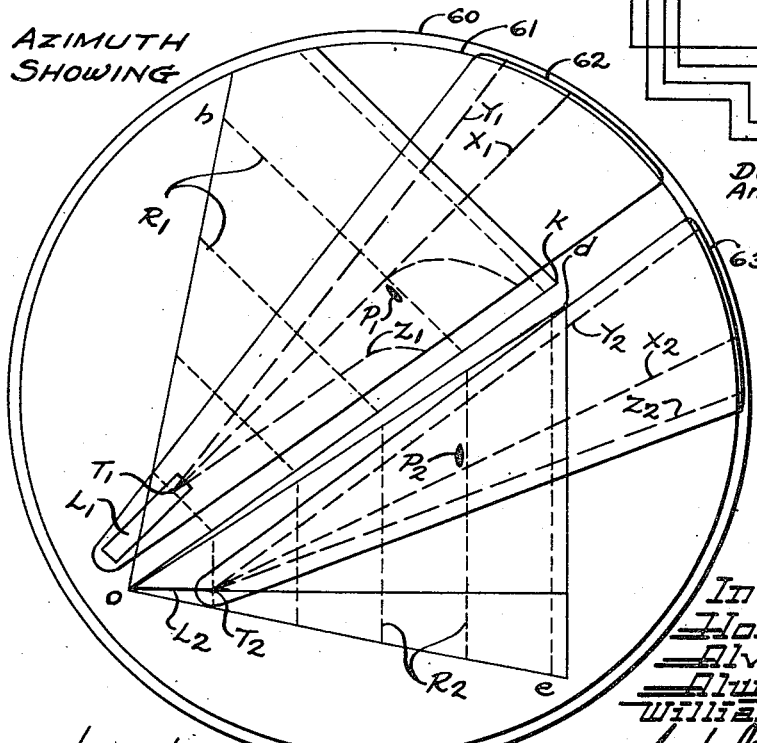

Patented Aug. 18, 1953

2,649,581

UNITED STATES PATENT OFFICE 2,649,581

SINGLE SCOPE TWO-COORDINATE RADAR SYSTEM

Homer G. Tasker, Van Nuys, Alvin L. Hiebert, Beverly Hills, Alwyn L. Kelsey, North Hollywood, and William E. Osborne, Los Angeles, Calif., assignors to Gilfillan Bros., Inc., Los Angeles, Calif., a corporation of California Application September 29, 1947, Serial No. 776,702

32 Claims. (Cl. 343—11)

A general object of this invention is to provide means by which two or more separate and distinct two-dimensional representations, displays or pictures may be shown effectively simultaneously on the screen of a single cathode ray tube. This is accomplished by scanning one of the displays upon one portion of the screen, switching to the second display and scanning it upon a second portion of the screen, and repeating this procedure as a continuous cycle. By appropriate selection of the persistence time of the fluorescent screen in accordance with the frequency of this cycle, both displays can be made visible practically continuously, and hence can be viewed simultaneously. Although our system is here described and shown as providing for only two separate displays, it will be understood that our invention can be applied equally well to the showing of more than two displays on one tube, the modifications and extensions necessary to accomplish this being evident from the present description.

This broad general purpose we accomplish with the help of means which perform three more or less distinct functions, the accomplishment of which constitutes three specific objects of our invention.

Firstly, after the scanning of one display is completed and before the scanning of the next is begun, the "zero" or origin position of the cathode ray beam is shifted on the screen by a controllable selected amount. This displaces one complete display relative to the other, so that the two displays do not overlap, or so that they overlap in a manner and to an extent which can be controlled.

Secondly, and during the same time interval, the circuits which control both the intensity of the cathode ray beam and its position with respect to its "zero" position are switched from control by input impulses associated with one display to control by impulses associated with the other display. Thus the primary control circuits by which each display is reproduced need not be basically different from the circuits by which such a display would normally be reproduced alone on a cathode ray tube. However, the circuits are modified in various respects, one type of modification being the provision just referred to for switching control from one set of input signals to the other. Adjustments of all the types normally provided in connection with the display of a single picture on a cathode ray screen can be provided in such a form that they are separately adjustable for the two pictures.

In the third place, our invention includes means for limiting the screen area occupied by each of the displays, by cutting off certain selected non-essential portions of them. This procedure, which we here call "pattern clipping," or merely "clipping," permits the two pictures to be so altered in shape that they can be fitted together more closely on the screen, while still avoiding any interference or overlapping between them, and without distortion of those portions which are preserved.

A significant object of our invention is the simplification and increased effectiveness of a radar aircraft landing system in which the above described means are employed to display in adjacent and related positions on one cathode ray tube information that has previously required two separate tubes. In former systems one tube was controlled by a radar system scanning in azimuth, and showed the position of the landing aircraft plotted on a coordinate grid representing range and azimuth angle; a second tube was similarly controlled by a second radar system scanning in elevation, and showed the aircraft range and elevation angle. The physical separation between the azimuth plot and the elevation plot made it impracticable for one operator to read both pictures and communicate the information to the pilot of the aircraft. Two additional operators were therefore used, who in effect read the two separate plots of aircraft positions and translated them into the simpler form of deviation from correct position, in azimuth and elevation respectively. In this form the information was displayed to the chief operator by various special devices, and was relayed by him to the pilot of the landing aircraft.

According to our invention the complete information furnished by the two radar systems is presented on the screen of a single cathode ray tube to the chief operator, who thereupon becomes the only operator. With the two plots in close juxtaposition they can be read accurately and virtually simultaneously by this single operator, who is then able to communicate the necessary information to the pilot more rapidly and in greater detail than was previously possible.

A further object of the present invention is to provide means by which the combined display can include electronically produced lines, here called V-follower lines, which indicate the angular position of each antenna in the coordinate in which it does not scan. The provision of such V-follower lines in general, and particularly in previous systems using two indicator tubes, is described and claimed in the copending patent application, now Patent 2,483,644, identified as follows: Serial No. 723,364, filed January 21, 1947, for Electronic Angle Indication with Particular Reference to Radar Systems; inventors Alwyn L. Kelsey, Alvin L. Hiebert, Homer G. Tasker, and William E. Osborne.

Other objects and advantages of our invention will be understood from the following detailed description of a preferred embodiment. This particular form of our invention is peculiarly adapted to the use just described in connection with radar aircraft landing systems, and for clarity it will be described entirely with relation to this use; but we do not intend this fact or the particular means employed in this illustrative embodiment to limit the scope of our invention.

Fig. 3 is a block diagram of circuits used with one indicator tube of the previous system;

Fig. 4 shows the elevation indicator tube electronic display and superposed map and flight tab of the previous system;

Fig. 5 is a diagram of the combined azimuth and elevation displays according to a preferred modification of the present invention, including maps, flight tabs and V-follower lines;

Fig. 6 is a cycle diagram illustrating the time course of scanning and switching operations;

Fig. 7 is a schematic perspective of azimuth and elevation antennas, showing associated equipment;

Fig. 7a is a fragmentary schematic perspective similar to a portion of Fig. 7, but showing a modification;

Fig. 8 is a block diagram of the circuits associated with the combined indicator tube;

Fig. 9 is a schematic circuit diagram illustrating a centering circuit providing separate azimuth and elevation adjustments;

Figs. 10 to 14 and 10a to 14a are schematic diagrams illustrating various particular forms of indicator tube patterns, clipped in accordance with our invention;

Fig. 15 is a schematic circuit diagram showing clipping circuits adapted to give the patterns shown in Fig. 5;

Fig. 16 is a schematic diagram illustrating the requirements for a straight clipping line of a certain type;

Fig. 17 is a schematic circuit diagram showing typical V-follower circuitry;

Fig. 18 is a block diagram similar to Fig. 8, but showing a modification;

Fig. 19 is a diagram similar to Fig. 5, but showing a modification; and

Fig. 20 is a diagram illustrating certain conditions of adjustment of the circuits.

It will be convenient to describe first the basic elements of a typical aircraft landing aid system without reference to the application of our invention to it. We will describe first that part of the system which scans in azimuth, it being understood that the elevation scanning is carried out in a similar way.

Periodic, half-microsecond pulses of radio frequency oscillations are generated by a modulated oscillator circuit, and are conducted to the azimuth antenna from which a beam of controlled form is projected. This beam may be relatively wide in elevation, but is narrow in azimuth in order to give good azimuth definition. The direction of projection is adjustable in elevation by mechanical rotation of the entire antenna and reflector assembly. The direction of the beam in azimuth is varied periodically by mechanical modification of the antenna structure, causing the beam to sweep uniformly back and forth over an angle of approximately 20°. This motion, which we call scanning, has a frequency of roughly one cycle per second. Wave pulses reflected from any object within the projected beam are picked up by the same antenna system and transmitted as an input signal to the video amplifier. Each radio frequency pulse is initiated by a basic trigger pulse which serves as a time reference point by which to correlate the reflected signal with other elements of the system with respect to time.

Figure 1:
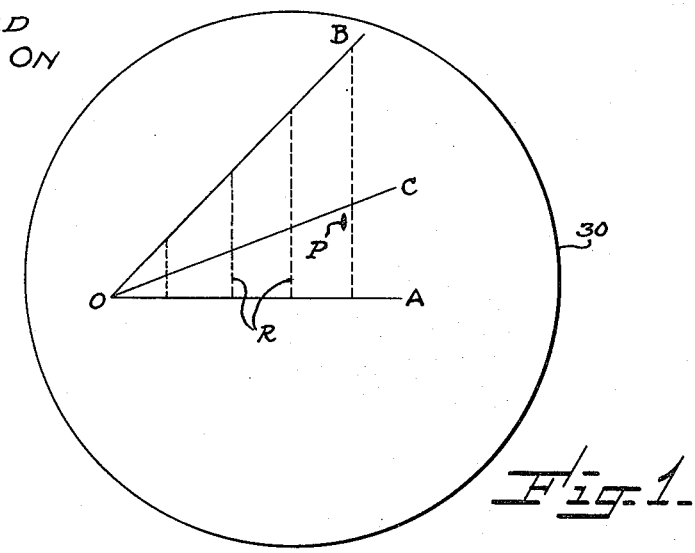
Fig. 1 shows a simplified form of electronic display on the azimuth indicator tube screen of a previous system.

The reflected video signal is amplified and transformed into a positive voltage pulse which is applied to the grid of the azimuth indicator tube. This is a conventional cathode ray tube with two sets of magnetic deflection coils so arranged as to deflect the electron beam respectively parallel to two mutually perpendicular axes, the "time base" axis which is typically horizontal as viewed by the operator and the "expansion" axis which is typically vertical. Each basic trigger pulse is made to initiate a current wave of sawtooth form through the time base deflection coils, and a current wave of similar form through the expansion deflection coils, the current in each wave increasing approximately linearly with time, and then returning rapidly to zero. Referring to Fig. 1, in which the fluorescent screen of the cathode ray tube is generally indicated by the numeral 30, these deflection currents cause the electron beam to sweep from its zero position O along a straight line such as OC which forms some definite angle with the time base axis OA; the angle AOC for a particular sweep depending upon the relative amplitude of the currents in the two sets of deflection coils. If the current amplitude in the vertical deflecting coils is zero the beam will sweep along the time base axis OA (typically horizontal as viewed by the operator), while if the two amplitudes are equal the sweep line will be at 45° to this direction. It will be understood that electrostatic deflection of the cathode ray beam can be used instead of electro-magnetic deflection, appropriate modifications being made in other parts of the equipment. For clarity of explanation, and without intending to limit the scope of our invention, we describe its use throughout in connection with the electromagnetic type of tube only.

Correlation of the tube display with respect to azimuth angle of the scanning radar beam is obtained through a direct current voltage, generated by suitable means linked with the antenna scanning mechanism. This voltage is related to the azimuth beam angle in an approximately linear manner, typically varying from plus 2 volts at one extreme of the scanning range to plus 50 volts at the other end. It will be referred to as the azimuth angle coupling voltage. The amplitude of the sawtooth variation of the time base deflection current is maintained essentially constant. The amplitude of the expansion current, on the other hand, is automatically varied in accordance with the azimuth angle coupling voltage, so that the angle of sweep of the electron beam corresponds, preferably on an expanded scale, to the azimuth scan angle of the antenna. When the angle coupling voltage is a minimum, say, at zero azimuth angle, the expansion sweep is zero, giving a sweep trace parallel to the time base axis, indicated by the line OA in Fig. 1. As the angle coupling voltage increases, the angle of the sweep trace increases proportionately, reaching a line such as OB when the azimuth angle reaches its maximum value. Each intermediate angle of the sweep trace corresponds to a definite scan angle of the radio frequency beam. This correspondence is independent of the rate of scan and is maintained whether the direction of scan is from A to B or from B to A. Actually the antenna scans first in one direction and then in the other, waiting after each scan while the elevation antenna and its associated apparatus (see below) completes a scan in elevation.

During the course of each scan by one antenna, the corresponding indicator tube is put in operating condition by application of the normal positive voltage to its anode. After completion of each scan this anode voltage is cut off by means of a so-called blanker switch, linked to the antenna scan mechanism and accurately timed to apply the normal anode voltage to the tube only during the actual period of scan of the antenna. When this voltage is cut off, as during the scanning operation of the other antenna, the indicator tube is completely inoperative.

Even when the anode voltage is applied to the tube during a scan by its antenna, the tube is fully operative only when a suitable intensifying voltage is applied to its grid, bringing the tube approximately to cut-off condition. A relatively small additional video signal, whether as a positive voltage pulse applied to the grid or a negative voltage pulse applied to the cathode, then strengthens the cathode beam, making it momentarily visible on the screen as a dot or line whose position is determined by the currents flowing at the moment in the two sets of deflection coils. The intensifying grid voltage is applied automatically during the course of each outward sweep of the cathode beam from its origin, and is cut off after completion of each sweep. Spurious signals are thus prevented from appearing on the screen during the intervals between successive sweeps by absence of a grid intensifying voltage; and during the intervals between successive scans of the corresponding antenna by absence of the anode voltage.

During the antenna scan, each basic trigger initiates a radiated wave pulse from the antenna and also initiates a sweep of the associated cathode ray beam. The video signal reflected from the target is picked up by the antenna at a time, measured from the basic trigger, proportional to the target range. During this time the cathode beam has moved a corresponding distance along its sweep path, the sweep velocity being determined by constants of the sweep generating circuits. Therefore the bright spot on the screen produced by the amplified video signal appears at a definite position along the sweep path corresponding to the target range. Moreover, a video signal is received only during those sweeps whose angle corresponds to an azimuth scanning angle close to the azimuth angle of the target. The position of the resulting bright spot on the screen (P in Fig. 1) therefore corresponds to the location of the target in both range and azimuth angle. The result is an expanded two-dimensional plot of aircraft position. By indicating on this plot the selected flight path (by means of a "flight tab," described below), the position of the aircraft with respect to the desired flight path can be read directly.

To facilitate reading from the plot the aircraft range from the runway, it is usual to provide electronically produced range marks. The range marks are usually applied like the video information by means of positive going intensifying pulses applied to the grid of the indicator tube. Very brief pulses are produced by special circuits at a series of definite times following each basic trigger, the times being chosen to correspond to any desired specific ranges. Since the time base sweep, as so far described, is uniform and independent of the azimuth scan angle, the range marks thus produced will be straight lines at right angles to the time base axis. If the amplitude of the time base deflection current is changed, the rate of sweep of the electron beam parallel to the time base axis will change, but since the position of the range marks is controlled entirely by a time relation they will move correspondingly, and will continue to represent the target range correctly. Typical range marks are represented in Fig. 1 by the lines R.

To provide clear correlation between the aircraft position and the predetermined glide path to the landing strip, two types of diagram drawn on transparent sheets are superposed on the face of the indicator tube. One of these, here referred to as the azimuth map, is drawn on the relatively fixed sheet 31 and carries lines shown as solid lines in Fig. 2. These include angle line $O_1A_1$ and $O_1B_1$, corresponding to the extreme sweep line OA and OB of Fig. 1; range lines which coincide with the electronically applied range marks $R_1$ and some or all of which may be omitted entirely or may be replaced, as in the preferred modification in Fig. 2, by mere index marks $r_1$ appropriately spaced along one of the angle lines; and an outline $L_1$ corresponding to the location of the runway. The position of the runway on the map, and particularly its relation to the zero point $O_1$ of the sweep paths, is determined by the relative location of the runway itself and the antenna of the radar system. The second type of diagram, shown by dashed lines in Fig. 2 and here referred to as the azimuth flight tab, shows the center line $X_1$ and the allowable error limits $Y_1$ and $Z_1$ of the predetermined glide path. These are drawn on a transparent sheet 32, which is adjustably mounted for rotation around that point of the runway which has been selected as the touch-down point, indicated by $T_1$ in Fig. 2. It will be noted that the glide path lines $X_1$, $Y_1$ and $Z_1$, radiate from the touchdown point $T_1$, rather than from the sweep path origin $O_1$, and hence indicate the aircraft azimuth angle with respect to the touchdown point.

Angle reference lines can be produced electronically if desired, much as the electronic range marks are produced, but since they almost necessarily radiate from the sweep path origin $O_1$, their usefulness as reference lines is limited to special purposes, such as, for example, the indication on one two-dimensional plot of the sector to which the other two-dimensional plot momentarily corresponds (see below).

Figure 2:
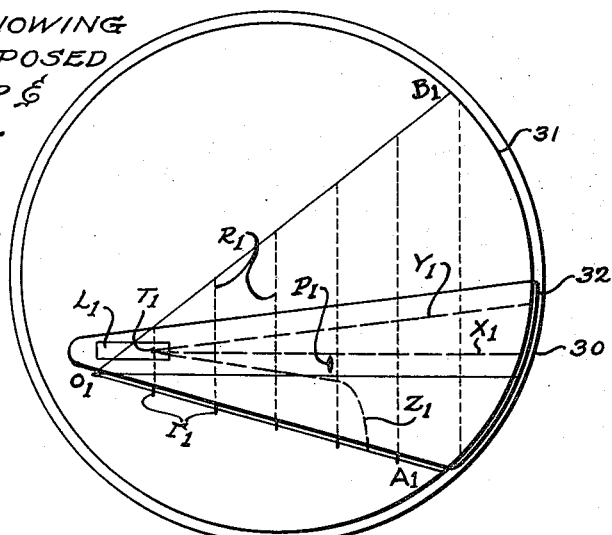
Fig. 2 shows the azimuth indicator tube electronic display and superposed map and flight tab of the previous system.

It will be noted that the angles of corresponding sweep paths in Fig. 2 are rotated clockwise relative to those of Fig. 1 enough to make the sweep line, which corresponds with a direction of antenna radiation in a vertical plane parallel to the runway axis $X_1$, appear as a horizontal sweep line on the tube screen before the observer. This facilitates tracking the approaching aircraft by making its normal apparent line of approach $X_1$ horizontal. This re-orientation is accomplished by physically rotating the entire indicator tube the necessary amount, determined by the actual orientation of the azimuth antenna relative to the runway; and by adjusting certain relation in the electrical circuitry which controls the position of the cathode beam, as will appear. Again for ease of reading the scope pattern, the range marks are then made perpendicular to the runway axis rather than to the time base axis as in Fig. 1. This is accomplished by modifying the circuit which generates the sawtooth current through the time base (horizontal) deflection coils so that the amplitude of the current is modulated under control of the angle coupling voltage, decreasing slightly with increasing azimuth angle. This has the effect of tilting the range marks to the left as seen on the screen. The degree of modulation is adjusted till the range marks are perpendicular to the runway axis on the map. The separation of the electronically produced range marks is adjusted to agree with the range marks $r_1$ on the map by varying the gain of the time base sweep amplifier. The expansion amplifier is similarly adjusted to vary the vertical deflection till the various angle marks agree with the map. It is, of course, assumed that the centering adjustments, provided in connection with the sweep amplifiers, have been set to bring the zero beam position O to the point $O_1$ of the map. When these adjustments are made the lines of map 31 coincide or agree with the display on the cathode ray tube screen 30, serving primarily as a check on the correctness of the settings.

A block diagram of typical sweep amplifier and other indicator tube circuits is shown in Fig. 3. For clarity this will be described as belonging to the azimuth system, it being understood that the elevation system involves similar equipment. Each basic trigger generates in the sweep multivibrator 40 a negative and a positive square wave which are substantially simultaneous. The negative wave is transmitted over line 41 to the intensifying channel where it is amplified at 42 and clipped at 43 to give the required wave form, and delivered as a positive square wave to the grid 50g of the indicator tube 50, bringing the tube to cut-off condition for the duration of each sweep. The positive square wave from multivibrator 40 is transmitted via line 45 to both expansion and time base channels, which are of similar design and include modulating stages 46 and 47 as well as amplification stages 48 and 49 respectively. The amplified pulses are applied over lines 45a and 45b to the expansion and time base deflection coils 56 and 57 respectively. Although these pulses are of substantially square wave form, they produce currents of sawtooth form in the deflection coils, due to the large impedance of these coils, the current increasing substantially linearly with time during the course of each sweep, and returning to its initial value, which may be zero, during the interval between successive sweeps.

The angle coupling voltage may be applied as indicated directly to the modulating stage 46 of the expansion channel, but is inverted in 44 before application to the time base modulator 47. The amplitude of the resulting time base deflection current decreases slightly with increasing azimuth angle. The corresponding sawtooth current pulses produced in the expansion deflection coils 56 by the expansion channel increase with azimuth angle from zero to a value approximating that of the time base deflection current, the sweep angle increasing accordingly.

Various methods are available for centering, or adjusting the normal currents in the deflection coils to bring the zero point of the pattern to the desired location on the tube screen. For purposes of illustration we assume a centering tube so connected that its plate circuit provides an alternative route for steady current through the deflection coils in parallel with the final stage of the sweep amplifier which carries the varying (sweep producing) component of the current. This steady current is readily controlled by varying the grid bias on the centering tube. Centering circuits of this type are indicated in block form in Fig. 3 at 54 and 55.

The basic trigger is also supplied, as indicated in Fig. 3, to the range mark generating circuits 58, which produce pulses at definite times following the trigger, corresponding to the range marks desired. These are combined with the amplified video signal in 59 and both are applied as negative pulses to cathode 50c of the indicator tube.

The positive supply voltage for the anode 50a of the tube is controlled by blanker switch 94. This is operated by the antenna scan mechanism (see below) and applies anode voltage during the period of scan of the azimuth antenna.

All of the above described circuits related to the azimuth antenna and controlling the azimuth indicating tube are effectively duplicated for the elevation indicating tube. For present purposes these circuits may be considered to be essentially identical with the azimuth circuits, but the elevation antenna is so constructed as to produce a radio beam which is relatively wide in its azimuth dimension and relatively narrow in elevation. This beam scans in elevation in response to mechanical variation of the antenna structure and is adjusted in azimuth by rotation of the entire antenna system. As before, a direct current angle coupling voltage is generated which is directly proportional to the elevation angle of the antenna beam. This voltage is used to modulate the sweep currents through the deflection coils of the elevation indicator tube, producing a sweep pattern which is fully analogous to the azimuth display already described. Adjustments are made to make the sweep line, which corresponds to the antenna pulse that is parallel to the runway surface, appear as a horizontal line on the tube screen before the observer; and the time base sweep is modulated by the inverted elevation coupling voltage to tilt the range marks into vertical position.

The appearance of the resulting display on the screen 33 of the elevation indicator tube can be seen from Fig. 4, in which the diagram on the elevation map 34 is shown in solid lines and that on the elevation flight tab 35 in dashed lines. The runway now appears at $L_2$ with the selected touchdown point at $T_2$, and $X_2$, $Y_2$ and $Z_2$ represent the center and upper and lower permissible limits of the predetermined approach path.

In actual practice it is customary to avoid duplicating the radio frequency oscillator and the receiving amplifier for the two coordinates to be scanned. Instead, single oscillator and amplifier units are connected to the azimuth antenna for the period of one complete scan over the azimuth range and are then disconnected from this antenna and connected instead to the elevation antenna while it scans through its complete range. These connections are made and broken by switches operated in synchronism with the antenna scan mechanisms. The video signal after amplification is applied to the cathodes of both azimuth and elevation indicator tubes regardless of which antenna picked it up; but only one of these tubes at a time is rendered operative by application of the required positive voltage to its anode. This voltage is cut off from each tube by the blanker switch while the other tube is operating, and also during the short intermediate periods required for the above described switching of oscillator and video amplifier from one system to the other. Thus the azimuth and elevation indicator tubes are active alternately, like their respective antennas, the electron beam in each tube scanning the complete display once each time the tube is active. The persistence of the fluorescent screen material is sufficient so that on both tubes the aircraft position and other indications are in effect continuously visible.

Coming now to the application of the present invention to the above described landing aid system, we show in Fig. 5 a preferred form in which we combine on the screen 60 of one cathode ray tube both azimuth and elevation information, which formerly required two separate tubes. The vertical dotted lines represent the range marks (actually continuous) produced by the cathode ray beam; the light solid lines are the maps, drawn now on a single transparent sheet 61 superposed (optically or mechanically) on the face of the tube; and the dashed lines are drawn on the azimuth and elevation flight tabs 62 and 63, also transparent superposed sheets, one adjustable to pass through any desired touchdown point $T_1$ of the azimuth display at any desired angle, and the other through the corresponding point $T_2$ of the elevation display at any desired angle. The bright spots at $P_1$ in the azimuth display and at $P_2$ in the elevation display indicate an approaching aircraft which is a little above and to the right (as seen from the runway) of the predetermined glide path $X_1$ and $X_2$. In both displays the axis of the runway ($L_1$ and $L_2$) appears horizontal; that relative alignment of the two showings being obtained by the same kind of adjustments of the beam controlling circuitries as in the previous two-tube systems. The lines $U_1$, $V_1$ in the azimuth display and the lines $U_2$, $V_2$ in the elevation display, shown in dotted lines, are so-called V-follower lines, the production and use of which will be explained below.

By comparing Fig. 5 with Figs. 2 and 4 it will be clear that in the combined showing of Fig. 5 the azimuth display is directly below the elevation display, the range marks $R_1$ of one appearing as continuations of the range marks $R_2$ of the other. This is a great convenience to the operator and tends to prevent any possibility of confusion, particularly when a number of aircraft are approaching the runway at the same time. Because of the continuity of the range marks, the azimuth image $P_1$ of an aircraft is always directly below the elevation image $P_2$ of the same aircraft. This facilitates the identification of the two corresponding images from among a large number which may be visible. Also, if the azimuth image is partially obscured by the presence of ground reflections, it can be distinguished from the background more readily by reference to the elevation display, which is less subject to such disturbances.

Each display is generated as before by repeated sweeps of the cathode ray beam from the zero point $O_1$ or $O_2$ at a gradually varying angle which corresponds on an expanded scale to the momentary angle of scan (in azimuth or in elevation) of the radio frequency beam from the associated antenna. One display is scanned completely, the angle varying clockwise; then the other display is similarly scanned clockwise; then the first display is scanned in the opposite sense, the angle varying counter-clockwise, and the second display is finally scanned counter-clockwise. A complete cycle of the antenna mechanism and associated circuit switching therefore produces two complete scans of each picture. This particular sequence of scanning is not an essential feature of our invention. For example, if the antenna mechanism were appropriately modified the direction of scansion might be always clockwise or always counter-clockwise, rather than alternating as in the present system, and such a change in mode of scanning would not require any significant changes in those parts of the system directly concerned with our invention.

Fig. 6 shows a schematic diagram of the time relations involved in such a scanning cycle, which typically occupies a time of from one-tenth to one second. Forward progress of time is represented by clockwise motion about this diagram. The central circular region of Fig. 6, marked N, shows the time schedule of the scanning operations of the two systems. Opposite quadrants represent complete scans by the same system, but carried out in opposite directions. The shaded areas (each comprising roughly 10° of the complete 360° cycle) represent the periods during which the oscillator and amplifier are switched from one antenna to the other. Unshaded areas of region N represent time periods during which one or other of the antennas is in use, sending radio frequency pulses and receiving reflected signals from objects within the field of coverage of the beam. Shaded areas indicate inactive periods, during which switching takes place, both antennas being momentarily isolated from the oscillator and receiver by operation of switches in the radio frequency wave guide transmission lines. These switches can be of conventional type, using rotating shutters to block first the azimuth and then the elevation branch of a T-form wave guide transmission line.

The inner annular region M of Fig. 6 represents the time schedule of the voltage applied to the anode of the indicator tube, which brings it into condition for operation. Unshaded areas represent parts of the cycle during which this anode voltage is applied, shaded areas periods when the anode voltage is cut off, making the tube inoperative. It will be noted that the tube is dark during the periods of switching between azimuth and elevation antennas, so that the patterns on the screen are not obscured by false images which might be produced during the switching process. It is not essential for the present invention that the anode voltage be thus cut off during switching, and the anode can in principle be maintained uniformly at its normal operating voltage. However, we prefer to darken the tube during switching, and removal of the anode voltage is a convenient and effective way of doing this. There is no essential distinction between the anode voltage applied during the azimuth display and during the elevation display. The anode voltage can be obtained from any suitable source and controlled as indicated in annular region M of Fig. 6 by any suitable switch means synchronized with the antenna scan mechanisms.

In practice it is sometimes convenient to add our combined indicator tube, showing combined azimuth and elevation displays, to a previous system with its separate azimuth and elevation indicator tubes; and to do this without interfering with normal operation of the separate tubes. We then preferably obtain anode voltage for the combined display tube from the regular anode supplies of the two separate tubes, which are already separately controlled in accordance with the required time schedule by blanker switches within the two systems. During the azimuth display, voltage is provided from the regular anode supply of the azimuth system, and during the elevation display voltage is similarly provided from the elevation system anode supply, no additional blanker switch mechanism being required. Cross connection between the two systems is prevented by use of an isolating tube (see below). Thus it is possible to show both displays on one cathode ray tube according to the present invention without interfering with the simultaneous showing of the two displays on separate tubes in the usual way.

The outer annular region of Fig. 6, marked L, shows the time schedule of current through the solenoids of a number of switching relays. These are operated in unison and serve to switch various parts of the circuiting (as will be shown in detail) from the azimuth display (relays actuated) to the elevation display (relays not actuated). The relay actuating current can be obtained, for example, from a cam actuated switch operated in synchronism with the antenna scanning mechanism.

The switching mechanism will be clear from Fig. 7, which is a perspective sketch, partly schematic, showing transmission line switches and also other elements of the switching system described above. All these elements are positively driven from a single shaft 89, one rotation of which corresponds to one complete cycle shown in Fig. 6. Each element on the shaft is preferably independently adjustable about the shaft axis, so that the relative timing of the various elements can be accurately established in accordance with Fig. 6.

The wave guide transmission line 80, equipped with the usual transmit-receive switch, not shown, for directing transmitted and received radio pulses, leads from the modulated radio-frequency oscillator, shown schematically at 81, and the receiver and video amplifier, shown schematically at 82. A T-joint 85 divides this transmission line into two branches 80a and 80e, leading through switch assembly 86 to the azimuth and elevation antenna assemblies 90a and 90e respectively. These branches have suitably placed shutter slots 87a and 87e which receive the rotating shutters 88a and 88e respectively. These are mounted on the common drive shaft 89, driven by motor 83, and have two blades each, arranged in opposite phase, so that when one antenna transmission branch is open the other will be blocked by its shutter. The shutter blades cover angles of approximately 100°, leaving openings of 80°, as required by region N of Fig. 6.

The same drive shaft 89 operates the two antenna scan mechanisms, assumed to be of conventional construction and built into the antenna assemblies. In the showing of Fig. 7 the eccentric cams 91a and 91e on shaft 89 operate pushrods 92a and 92e which are linked to their respective antenna scan mechanisms by any suitable means, indicated schematically by dashed lines. The cams may be essentially circular in shape, eccentrically mounted on the shaft, and oriented 90° out of phase, with their axes of eccentricity parallel respectively to the lobe axes of the corresponding shutter blades 88a and 88e. The total amplitude of oscillation of the pushrods then corresponds to an angular scanning range greater than is actually used. The end portions of this range are cut off by the shutters, each antenna being connected to transmission line 80 only while the antenna scans through the desired intermediate part of the total mechanical range. Since each of cams 91a and 91e has one lobe, while its associated shutter 88a or 88e has two, one opening in the shutter will find the antenna scanning in one direction, the other in the other direction.

The pushrods 92a and 92e are shown diagrammatically to be linked to the respective antennas through the angle coupling voltage generators 105a and 105e. These are therefore operated in synchronism with the antenna scan mechanisms, and the voltages which they generate correspond in a definite way to the momentary scan angles. In addition to its scanning action, each antenna is adjustable in the coordinate (azimuth or elevation) in which it does not scan. This adjustment may be manual or by suitable servo mechanism, indicated schematically at 106a and 106e. The linkages between these mechanisms and the respective antennas are indicated by dashed lines, and operate also the devices 107a and 107e which generate voltages directly related to the positions of adjustment of the antennas. These voltages are used in the V-follower system, to be described. Both types of voltage generators 105 and 107 may for example be rotary potentiometers whose contact arms are linked respectively to the antenna scan mechanisms and to the antenna position adjustments by any suitable means, mechanical or otherwise.

The azimuth and elevation blanker switches as used in previous systems are shown schematically in Fig. 7 as cam actuated switches 94a and 94e, operated by the two-lobed cam 95 and acting alternately to connect the azimuth anode supply to the anode of the azimuth indicator tube via line 97a, and then to connect the elevation anode supply to the anode of the elevation indicator tube via line 97e. Cam 95 is so formed and oriented on shaft 89 that each indicator tube anode is connected while its corresponding antenna is operating, as indicated in Fig. 6. Our invention does not require any modification in this switch, but connections are provided (see below) by which the common indicator tube receives intensifying anode voltage whenever either of lines 97a and 97e is energized.

The part of Fig. 7 thus far described is not significantly different from the corresponding elements of previous landing aid systems. According to our invention an additional switch is operated from shaft 89 to control current to the circuit switching relays already referred to. This switch is shown at 100 as operated by cam 101. This cam is so formed and oriented on shaft 89 that switch 100 is opened at the conclusion of each period of operation of the azimuth antenna and closed at the conclusion of each period of operation of the elevation antenna, as indicated in Fig. 6. The switch acts to complete a circuit over line 102 from ground to the solenoids of the switching relays.

We turn now to the functions of the relay switches operated by switch 100 as described above. Fig. 8 is a functional diagram showing the circuits controlled by these relays. In comparing this diagram with Fig. 3, it must be remembered that Fig. 3 shows sweep circuits associated with only the azimuth system (or the elevation system). Fig. 8, on the other hand, shows an indicator tube and related circuits which are associated with both the azimuth and the elevation systems, and which perform the functions which previously required two units such as Fig. 3.

In the preferred modification illustrated four separate relays K1101, K1102, K1103 and K1104 are used, each having two double throw switches $m$ and $n$. The coils of all four relays are connected in parallel between a source of positive voltage and switch 100, which leads to ground.

The two switches $m$ and $n$ of relay K1103 and switch $m$ of relay K1104 provide voltages of three types to the circuits of the V-follower system (see below and Fig. 17). The second switch, $n$, of relay K1104 connects the positive plate supply voltage alternately to the azimuth and elevation delay multivibrators of the pattern clipping circuits (see below and Fig. 15).

The sweep circuits, shown in the upper part of the Fig. 8, receive impulses as before from the basic trigger, generated at 109. The trigger is fed through the amplifier 110 to the sweep multivibrator 111. This generates a negative gate which is fed as before to the intensity amplifier 120 and clipper 121 and applied as a positive pulse to the tube grid 112g, bringing the tube to cut-off during each sweep. A positive gate is also generated in sweep multivibrator 111 and fed to the expansion and time base modulators 122 and 123, and from them through the expansion and time base amplifiers 124 and 125 and is applied as an essentially square wave of appropriate amplitude to the expansion deflection coils 113 and the time base deflection coils 114 respectively, causing current pulses of linear sawtooth form in the coils. Expansion and time base centering circuits 126 and 127 (see below and Fig. 9) are also connected to the deflection coils as before. The modulators 122 and 123 receive angle coupling voltages via switches $m$ and $n$ respectively of relay K1101. With the relay unactuated (as shown) the elevation coupling voltage from 105e is connected via line 186 through potentiometer 134 and switch $m$ to the expansion modulator 122; and through potentiometer 135 and inverter 130 and switch $n$ to the time base modulator 123. After completion of the elevation scan, relay K1101 is actuated by switch 100, breaking the elevation coupling voltage connections just described, and connecting the azimuth coupling voltage from 105a via line 185 through potentiometer 136 and switch $m$ to the expansion modulator; and through potentiometer 137, inverter 131 and switch $n$ to the time base modulator.

Inverters 130 and 131 perform functions entirely analogous to that of inverter 44 in Fig. 3. The potentiometers 134, 135, 136 and 137 control the amplitudes of the coupling voltages supplied directly to the expansion modulator and supplied indirectly through the inverters to the time base modulator. Thus the degree of modulation of the expansion sweep current, and hence the degree of angle expansion of the display, can be separately regulated for the azimuth display by adjustment of potentiometer 136 and for the elevation display by adjustment of potentiometer 134; and the degree of modulation of the time base sweep current, and hence the apparent angle between the range marks and the time base $O_1K$ or $O_2E$ (Fig. 5), can be separately regulated for the azimuth display by adjustment of potentiometer 137 and for the elevation display by adjustment of potentiometer 135. The potentiometer adjustments indicated in Fig. 8 can be supplemented or replaced by many different types of electronic control means, including the introduction, for example, of a stage of adjustable amplification between the coupling voltage generators 105a or 105e and the switches of relay K1101.

The centering circuits 126 and 127 in Fig. 8 are functionally the same as those indicated in Fig. 3, except that each centering circuit is capable of two separate adjustments, one effective when relay K1102 is actuated (azimuth display) and one when the relay is unactuated (elevation display). One pair of adjustments determines the position of point $O_1$ in Fig. 6 and the other pair determines point $O_2$. Thus the origins of azimuth and elevation displays are separately adjustable, the centering circuits automatically responding to one or other set of adjustments according as relay K1102 is actuated or unactuated.

A schematic diagram of a preferred modification of centering circuitry for the expansion deflection coils is shown in Fig. 9. The deflection coils 113 are connected between a 500 volt positive supply and two parallel circuits, one leading to ground through tube V1116, which is the final stage of the usual expansion amplifier 124, and the other leading through choke coil L1101 and centering tube V1117 to an 800 volt positive supply. Voltage across the latter tube is stabilized by parallel-connected gas tube V1118. The first of these two circuits feeds to deflection coils 113 the periodically varying sweep producing current component, while the second circuit provides a relatively constant but adjustable centering current component. The cathode resistor of centering tube V1117 is made up of two parallel connected potentiometers R1158 and R1159, the movable contacts of which are connected respectively to the normally closed and normally open contacts of switch $m$ of relay K1102. The switch arm is connected through grid resistor R1157 to the tube grid. The grid bias, and hence the centering current through the tube and through the coils 113, thus depends upon the position of relay switch $m$, being determined by the setting of potentiometer R1159 when relay K1102 is actuated (azimuth display) and by the setting of potentiometer R1158 when the relay is not actuated (elevation display). The two displays are therefore separately adjustable as to their vertical position (expansion component) on the indicator tube by means of the two potentiometers.

Time base deflection coils 114 are provided with centering circuitry which is similar or identical to that of Fig. 9 and functions in a like manner, controlled by switch $n$ of relay K1102. In fact, by appropriate changes of the numerals and lettering, Fig. 9 may be considered to illustrate the time base centering circuit. The potentiometers then provide separate adjustments of the azimuth and elevation displays with respect to their horizontal positions (time base component).

Centering circuits indicated in Fig. 8 are separately adjustable for azimuth and elevation displays in both expansion and time base coordinates. This is because the origins $O_1$ and $O_2$ of the two displays in Fig. 5 are displaced from each other in both coordinates, the time base coordinate being parallel to line $O_1K$ and the expansion coordinate normal to this line. If different patterns are used it will sometimes be sufficient to provide separately adjustable centering in only one coordinate, either expansion or time base, the two displays then being spaced in this coordinate only. If both displays are to have a common origin, points $O_1$ and $O_2$ of Fig. 5 coinciding, then no special centering need be provided and relay K1102 can be eliminated. In that instance each centering circuit will be fixedly adjusted to a single centering voltage value and the origin points of both displays will coincide. If, then, the two displays extend from the origin point into sectors which do not overlap there will be no confusion between them. If the two displays extend in the same general direction from the origin point they will confuse if they follow each other at intervals less than the period of image persistence. But if the alteration of the azimuth and elevation displays be made sufficiently slow with relation to persistence, the observer still may observe each display in sufficiently rapid sequence to readily identify the two corresponding images of a single object plane. It therefore is within the broader scope of our invention to not utilize the relative display shift, but the system utilizing the shift is preferred.

Returning now to Fig. 8, the receiver and video amplifier, shown at 82, receives its radio frequency signal from one or other of the antennas 90a and 90e via wave guide switch 86. The radio pulse oscillator 81 receives basic trigger pulses, as indicated, in response to which it supplies timed pulses through the same switch 86 to whichever antenna is connected. The same basic trigger is supplied to range mark generator 84, which supplies timed pulses at definite times after the trigger corresponding to definite target ranges. These are supplied to the video amplifier, in which they are mixed with the amplified video signal. The combined signals are applied as negative pulses via line 82a to the indicator tube cathode 112c. Separate adjustments for azimuth and elevation displays can be applied to range mark generator 84 in much the same way that has been described and illustrated for the centering circuits. However, this is not usually necessary since the range marks in both displays preferably correspond to the same set of ranges.

In connection with the immediately foregoing statement it may be noted that the preferred inter-relationship of the two displays (Fig. 5) is such that the pairs of corresponding range marks of the two patterns lie in a single line, so that the two images $P_1$ and $P_2$ always lie in a line which is parallel to the range mark lines, specifically in this case one directly above the other. That relative relationship is due to the fact that the adjustments of the centering voltages and the adjustments of the angle coupling modulations of the time base sweep pulse amplitudes for both displays are such as to make both sets of range marks parallel to the line of relative displacement $O_1O_2$ between the two origins of the displays. The time base sweep amplification (apart from this modulation) is the same for both displays, since the one time base amplifier 125 serves for both displays. Therefore, once the direction of the range marks is thus adjusted, corresponding marks of the two displays will be in a single line.

To summarize the general function of the relays K1101 and K1102, they transfer control of the sweep circuits from variables associated with one antenna and display to the corresponding variables associated with the other antenna and display. This is accomplished in such a way as to permit separate adjustment for the two displays of the relationship between the sweep circuits and the individual variables.

An alternative form of our invention makes use of two complete sets of sweep generating circuitry, one regularly connected to and controlled by azimuth variables and the other similarly related to elevation variables. Switching means, which can be generally similar to the relays indicated in Fig. 8, are then provided to connect the time base and the expansion deflection coils of the indicator tube to the respective channels of the azimuth sweep circuitry during the azimuth scan and to the channels of the elevation sweep circuitry during the elevation scan. Such an alternative form is considered less desirable than the preferred form in which only a single set of sweep circuitry is used. The preferred form, among other advantages, is simpler and more economical, and tends to give greater relative stability of the two displays, since a significant portion of the circuitry is used in common for both displays.

For clarity of explanation the description thus far has been directed primarily to the preferred type of display in which all sweep paths have a common point of origin, $O_1$ or $O_2$ in Fig. 5, the angle of the paths being related to the angle of scan of the antenna as described. Such sweep paths are generated by synchronized periodic deflection currents through both sets of deflection coils, each current performing a complete cycle of sawtooth variation in response to each basic trigger pulse.

Other types of display can be used to present the same information. For example, the position of the cathode ray beam along a sweep path can correspond, as before, to target range, but the antenna scan angle can be represented by some position factor of the sweep path other than its angle. In particular, the sweep paths may all be parallel and horizontal, and originate in a common line rather than in a common point; and the scan angle, acting through an angle coupling voltage or its equivalent, can determine the level of the sweep path rather than its angle. The range and scan angle will then be presented in Cartesian coordinates, the range (or time) axis being horizontal and the axis of scan angle being vertical. Sweep circuits for producing such Cartesian displays are well known. The time base sweep channel and the resulting sweep currents can be essentially the same as before, but the current through the expansion deflection coils changes only slightly between successive sweeps, and performs a complete cycle of variation directly in response to the angle coupling voltage. The frequency of the expansion current cycle is therefore the scan frequency, not the sweep frequency. The value of the slowly varying expansion current is determined in accordance with the scan angle, much as the amplitude of the rapidly varying sweep current pulses is determined in the preferred system described above. Therefore modulation of the expansion current by the angle coupling voltage takes place in a broad sense in both types of system, although the nature of the modulation and the detailed circuitry are different.

Our invention can be used in connection with the Cartesian type of display, as well as with other types, it being in many respects immaterial what type of sweep producing circuitry is employed. The broad objective of shifting control of the sweep production from one set of variables to another can be accomplished by the same or similar means, largely independently of the particular type of sweep pattern being produced.

In the particular application of our invention here described the two displays to be combined on the circular face of one indicator tube are of such a shape that they can be directly combined without overlap only at a greatly reduced scale. In previous systems (Figs. 2 and 4) it will be noted that the upper corners of both patterns are allowed to extend beyond the tube screen, since the portions of the displays thus lost are not important. As a result, the principal limitation upon the scale of the separate displays is the relation between the sweep length along the time base axis and the diameter of the tube screen (we shall assume throughout that the latter dimension is fixed).

If one such pattern is to be placed above the other in combined display, its upper corner can extend off the screen as before; but its important right-hand portion will normally be confused by being overlapped by the upper corner of the lower pattern. If the two patterns are separated vertically (or in any other direction) enough to avoid this overlap, they will need to be greatly reduced in scale in order to fit on the tube screen. We avoid this difficulty by eliminating the entire upper corner region of the lower pattern and preferably also a section at the base of the upper pattern. This allows the patterns to be closely spaced vertically without overlap, and permits their display on a single screen at very nearly the same scale as in the previous arrangement on two separate screens.

The portions or both patterns which we preferably clip can be seen by comparing Fig. 5 with Figs. 2 and 4. The azimuth display, which is preferably the lower one in our new arrangement, is clipped above a horizontal line HJ parallel to the runway axis and at a sufficient distance above it to allow for expected errors in the azimuth angle of approaching aircraft. In practice it is found that a satisfactory interval on the screen between clipping line HJ and the runway axis $X_1$ corresponds to an actual distance of about 2000 feet.

In the elevation (upper) display a section is cut out below horizontal runway axis $O_2G$ and to the right of a short generally vertical line EF. This line is located just to the left of and parallel to the upper limiting sweep path $O_1H$ of the lower azimuth display. The region thus eliminated from the elevation display corresponds to space below the runway level.

The small triangle $O_2EF$ which is retained below this level is well worth preserving, since it insures that an aircraft even at the point of landing $T_2$, will appear well within the lower border of the display. The triangle $O_2EF$ is also useful in adjusting the electronic display, particularly to make that sweep path which corresponds to a horizontal radar beam coincide with the ground line $O_2G$ on map 61. An accurate method of checking this adjustment, either in setting up the equipment or during its regular operation, is to compare the direct radar image G of some natural or artificial object close to the ground, with the image $Q_1$ of the same object reflected in the ground surface. Under normal conditions correct adjustment is indicated if map line $O_2G$ passes between the two images Q and $Q_1$, and is equidistant from them.

The general procedure which we use to clip certain areas of a display is to change the normal tube energizing voltage at one of the electrodes of the indicator tube (by which the tube is brought approximately to cut-off condition as described above) to a tube blanking voltage of appropriate sign to cut off the electron beam whenever the beam image, if it were visible, would be within an area to be clipped. This blanking voltage is controlled in accordance with one of two quantities, or with a combination of both. Broadly, one of these quantities is that which determines the position of the beam along a given sweep, and the other determines the position or angle of the sweep on the screen. In the present particular system these quantities are, respectively: the time measured from the basic trigger which initiates each sweep; and the angle coupling voltage which controls the angle of the sweep.

If the blanking voltage is applied at some predetermined and fixed time after the basic trigger, which we shall term the clipping time, the beam image will be cut off on each sweep at the point of the sweep which corresponds to that selected time, and therefore corresponds to a selected range. Thus the line of clipping will be parallel to the range marks, already described, that part of the display representing ranges longer that which corresponds to the selected clipping time being eliminated. This is illustrated diagrammatically in Fig. 10. Here $L_1$ represents what we shall call a time controlled clipping line, resulting in the elimination of the shaded portion of the display. The clipping time being the same for all sweep paths from lower sweep $S_1$ to upper sweep $S_2$, the resulting clipping line is parallel to the lines of equal range, R (whether these are included in the display or not).

If, on the other hand, the blanking voltage is applied at the moment of the basic trigger and is left on throughout the ensuing sweep, but only when the angle coupling voltage lies within a predetermined and fixed range of values, then the beam image will be cut off during the whole of those sweeps whose angle (formed with the time base axis) corresponds to this range of the angle coupling voltage; and during all other sweeps the display will be unclipped. The lines of clipping ($L_2$ in Fig. 11) will then be radial, extending from the zero point of the pattern along certain of the sweep paths, and the areas of the display which are eliminated will have the form of sectors with their vertices at the zero point of the pattern. Our invention permits clipping sectors one of whose radial boundaries is the upper or lower limit of the unclipped display, such as the upper or lower shaded areas of Fig. 11; or sectors within the display, such as the intermediate shaded area of Fig. 11. In these types of clipping the application of the blanking voltage is angle controlled and does not depend upon a time relation.

By employing both time and angle control together it becomes possible to obtain quite varied clipping patterns. A number of examples of such patterns will be described, but without any intention of exhausting the possibilities presented by our invention, or of limiting its scope.

If clipping is primarily time controlled, but the clipping time is varied or modulated in accordance with the scan angle, then the clipping line is no longer parallel to the range lines, as in Fig. 10, but can be made to slant across them at a greater or smaller angle, depending upon the degree of modulation; and to the right or left according to whether the clipping time is made to increase or decrease with the angle of sweep. Thus a modulated direct dependence of clipping time upon sweep angle (measured counterclockwise from the time base axis $S_1$) gives a clipping line like $L_5$ of Fig. 12, while modulated inverse dependence gives such a line as $L_6$. If dependence of clipping time upon sweep angle is linear, the resulting clipping line will in general be curved rather than straight. By means of an appropriate non-linear relation (see below) clipping lines of this type can be made straight; or their curvature can be controlled as desired, for example as is indicated by the clipping lines $L_7$ and $L_8$ of Fig. 13.

A clipping line which is primarily time controlled (whether unmodulated as in Fig. 10 or angle modulated as in Figs. 12 and 13) can be broken at any desired point and continued by a radial line segment. For example, clipping line $L_9$ of Fig. 14 can be produced by the same sort of circuiting which would give line $L_7$ of Fig. 13, plus means for rendering this clipping action inoperative when the scan angle exceeds that represented by the sweep line $S_4$. Similarly, the area limited by line $L_{10}$ in Fig. 14 can be clipped by combining the circuit that would clip at line $L_8$ of Fig. 13 with means for rendering the circuit inoperative at scan angles less than that of sweep line $S_5$.

The blanking voltage can also be applied at the start of the sweep and removed at a given time thereafter. This can give clipping patterns which are the inverse of those illustrated in Figs. 10, 12, 13, or 14, the shaded potrions then representing the visible display, and the unshaded portions being eliminated. It will be understood from these examples that many other clipping patterns can be produced.

The same principles of pattern clipping can be applied also to the Cartesian type of display, discussed above, as well as to other types of pattern. For example, in a system in which the sweep paths are all horizontal, their level being determined in accordance with the angle coupling voltage, all of the various types of clipping just described can be applied directly, without substantial change in the clipping circuits. The resulting patterns are indicated schematically in Figs. 10a, 11a, 12a, 13a, and 14a, which correspond respectively to Figs. 10, 11, 12, 13, and 14 for the preferred type of pattern. Corresponding elements in these two sets of figures are indicated by the same identifying letters and numerals.

Returning now to the present specific clipping problem (Fig. 5), it will be noted that clipping line HJ of the azimuth display is of the type described above as an angle-modulated time controlled clipping line, the angle dependence of the clipping time being inverse. The elevation display is clipped along a time controlled line EF, for which, however, the angle dependence is direct, and the clipping is omitted at scan angles above the horizontal. The clipping line FG is therefore of the type described above as angle controlled, and coincides with a sweep path. Thus, the line FG is necessarily straight and is made horizontal by selection of the point F at which clipping is stopped along line EF. On the other hand, in the case of line HJ of the azimuth display adjustments must be provided in the clipping circuits, first to make the line straight, second to make it horizontal, and third to adjust its level relative to the rest of the pattern. The level of clipping line HJ is set just below the horizontal clipping line FG of the elevation pattern, and is therefore dependent upon the relative vertical displacement of the two entire patterns. This is separately adjustable through the zero or centering adjustments which locate points $O_1$ and $O_2$.

A preferred form of the detailed circuiting by which we obtain the clipping pattern shown in Fig. 5, included in block form at 140 in Fig. 8, is shown in schematic form in Fig. 15. The blanking voltage is applied via line 190 to the anode 112a of the cathode ray tube 112 in the form of a negative going pulse of sufficient amplitude to cut off the electron beam. Describing first the broad functions of the various parts of Fig. 15, with reference also to Fig. 8, anode 112a is normally supplied with plus 300 volts from blanker switch 94a or 94e by way of isolating tube V6506 and clipping multivibrator V6505, which functions to drop the anode voltage to a low value (about 45 volts) whenever the display is to be clipped. The clipping multivibrator is fired by a clipping trigger pulse, supplied either from the azimuth variable delay multivibrator V6501 and V6502 or from the elevation fixed delay multivibrator V6504, according as the azimuth or elevation picture is being scanned. Double-throw switch n or relay K1104, controlled from cam-operated switch 100 (Fig. 7), functions to supply a plate voltage of plus 300 volts to one of the delay multivibrators at a time, rendering it operative and the other one inoperative. When relay K1104 is actuated the azimuth delay multivibrator is operative and the elevation delay multivibrator is inoperative, and the opposite holds when the relay is unactuated.

The delay multivibrator which is operative is triggered directly by the basic trigger (which also initiates each sweep of the cathode ray beam) over connection 176. This trigger shifts the multivibrator from its stable to its unstable state, and as it returns, after a definite time delay, to its stable state it generates the clipping trigger. The azimuth delay multivibrator is so connected that its time delay varies between adjustable limits in accordance with the azimuth angle coupling voltage, which is fed to it through a cathode injector tube V6503a (see below). The elevation delay multivibrator is not directly angle controlled with respect to its time delay, but the elevation angle coupling voltage is applied through a switching tube V6503b in such a way that the multivibrator is rendered inoperative for all values of the angle voltage above a predetermined value.

Considering now first the azimuth part of the circuiting, the azimuth delay multivibrator comprises the two pentodes V6501 and V6502. Their cathodes are grounded and their plates are connected through the resistances R6502 and R6511 respectively to the normally open contact of relay switch K1104n, so that when the relay is actuated they receive plus 300 volts from the regular azimuth indicator supply through the switch arm and line 175. The control grid of tube V6501 is connected through resistance R6504 to a source of negative voltage, and also through resistance R6509 and condenser C6505 in parallel to the plate of tube V6502. The control grid of tube V6502 is connected through condenser C6503 to the plate of tube V6501, and also through the variable resistor R6505 to the plate of cathode injector tube V6503a, the potential of which varies with the azimuth scan angle (see below). The basic trigger is brought in over line 176 through condenser C6501 and applied to the control grid of tube V6502. The output gate from the delay multivibrator is taken from the control grid of tube V6501 over line 180 and differentiated by the series capacitor C6507 to give the required clipping trigger, which is conducted over line 181 to the grid of the clipping multivibrator tube V6505b.

In the normal stable condition of the azimuth delay multivibrator, the control grid of tube V6502 is positively biased, so that the tube conducts strongly and the voltage drop in plate resistor R6511 holds the plate voltage to a moderate value. The grid of tube V6501 is then negatively biased beyond cutoff at a potential determined by resistances R6509 and R6504 acting as a voltage divider. When the negative going basic trigger is applied to the grid of V6502, that tube is cut off, raising its plate potential abruptly and applying a positive voltage pulse through condenser C6505 to the grid of tube V6501. This tube therefore starts to conduct, and a negative pulse is transmitted from its plate through condenser C6503 to the grid of V6502, reinforcing the original effect of the basic trigger. The tubes thus switch functions abruptly from their stable to their unstable state of conduction, as in a conventional multivibrator, the condenser C6503 becoming charged with the grid of V6502 negative. As this charge leaks off through resistance R6505, the grid becomes gradually more positive, until a critical voltage is reached at which the multivibrator shifts abruptly back to its stable condition.

The square wave voltage gate which results from such a complete cycle of the multivibrator is tapped from the grid of tube V6501 via line 180 and applied to condenser C6507 which differentiates the gate, giving a sharp positive going pulse at a time nearly coincident with the basic trigger, and a sharp negative going pulse at a later time, determined by the gate length. This time is the time required for condenser C6503 to discharge sufficiently through resistance R6505 to bring the grid of V6502 to the critical voltage mentioned above. This time is controllable, as in the conventional multivibrator, by varying the resistance R6505. The rate of condenser discharge is also controllable by varying the potential to which resistance R6505 is connected, which is here the potential of the plate of tube V6503a. By making use of this latter type of control we are able to vary the gate length accurately and rapidly in accordance with a varying voltage, in contrast to the usual varying resistance, and we thus avoid any mechanical operation such as the movement of a rheostat contact. In the present use, this permits the gate length to be varied in accordance with the azimuth angle coupling voltage, which is applied to resistance R6505 through cathode injector tube V6503a.

The cathode injector tube V6503a functions in the first place as an impedance changer to avoid unnecessary current drain from the source of direct current coupling voltage; and in the second place it modifies this voltage, considered as a function of azimuth scan angle, from a linear function to a predetermined non-linear function. The plate is connected through resistor R6513 to a source of positive voltage, and also (as has been stated) through resistor R6505 to the grid of multivibrator tube V6502. The cathode of the injector tube is connected through variable resistance R6507 to a source of negative voltage, and through variable resistance R6515 and line 185 to the source of azimuth angle coupling voltage, which typically varies from plus 2 volts when the azimuth angle is a minimum (sweep path $O_1K$ in Fig. 5) to plus 52 volts when the angle has its maximum value (sweep path $O_1H$ in Fig. 5).

Since the grid of the injector tube is grounded, the effective grid bias depends only upon the voltage of the cathode. In operation this is controlled primarily by two factors: the voltage drop through R6507, due mainly to the tube plate current; and the varying angle coupling voltage applied through R6515. As to the first, an increase in R6507 increases the voltage drop, making the cathode more positive, reducing the plate current and making the plate more positive. For any given angle coupling voltage this reduces the time of discharge of condenser C6503 and hence reduces the gate length. Essentially the same result is also obtained by reducing resistance R6505. The clipping time for all scan angles is then reduced and each point of the line HJ in Fig. 5 is moved more or less uniformly toward point $O_1$. In effect this lowers the level of the line HJ, so that a larger portion of the display will be clipped. Conversely, an increase of resistance R6505 in series with the condenser, or a decrease of cathode resistor R6507 of the injector tube will increase the clipping time and allow a larger portion of the display to be seen. In practice R6505 is adjusted to bring the point H to the desired position along $O_1H$.

With regard to resistance R6515, the primary effect of its variation is to change the sensitivity of dependence of clipping time upon scan angle. The cathode potential of tube V6503a becomes more positive with more positive angle coupling voltage, reducing the plate current and making the plate more positive. As already explained, this reduces the clipping time, cutting off the sweep closer to zero point $O_1$ in Fig. 5. Since the angle coupling voltage is more positive at larger azimuth angles, this leads to a clipping line like HJ, the sweep being shortest at the highest azimuth angle ($O_1H$) and extending progressively farther to the right as the angle decreases. Below the azimuth angle corresponding to sweep $O_1J$ the clipping time continues to become longer with decreasing angle coupling voltage, but this is not evident since the clipping action takes place after the sweep has been completed and the beam has been blanked out along line JK by termination of the regular intensifying gate applied to grid 112g over line 235 (Fig. 8).

As resistance R6515 is reduced, the range of clipping time between the shortest sweep $O_1H$ and the longest sweep $O_1J$ of clipping line HJ occurs with in a smaller range of scan angles. The angle $HO_1J$ therefore becomes smaller, and clipping line HJ becomes more nearly parallel to the sweep paths which it crosses. Conversely, as resistance R6515 is increased, the clipping line HJ rotates clockwise relative to the pattern. Finally, if R6515 were made infinite, the cathode potential of tube V6503a, and hence the clipping time, would become independent of scan angle, and the clipping line would become parallel to the range lines (see above).

In practice the angle of clipping line HJ in the display is readily set by adjusting resistance R6515, the point H being held at a fixed distance from O₁ by simultaneous adjustment of either R6505 or R6507. (It may be noted that adjustment of either of the two last mentioned resistances, and particularly R6507, causes some change in the angle as well as in the level of the clipping line; but this change of angle is less marked than that caused by a comparable variation of R6515.)

As has been mentioned briefly, the production of a straight clipping line HJ requires a non-linear dependence of clipping time upon scan angle. For example, a special and somewhat simplified case is illustrated diagrammatically in Fig. 16, in which the points O, H₁ and J₁, correspond generally to points O₁, H and J of Fig. 5, but for clarity the time base axis OK₁ is assumed to be horizontal. A number of sweep paths S are drawn, corresponding to equal increments of scan angle (as distinguished from the sweep angle). The clipping times for these various sweep paths are proportional to the time base coordinates of the points at which they intersect the clipping line H₁J₁. These times are indicated by Ot₁, Ot₂, etc. It is obvious from this diagram that the clipping time bears a non-linear relationship to the scan angle. The analytical form of the actual relationship is of relatively little importance, since in practice the electric circuit is adjusted empirically.

In general the form of the dependence of clipping time upon scan angle is controlled mainly through two distinct circuit factors. These are (1) the tube characteristics and conditions of operation of the injector tube V6503a, which results in a plate potential which is not necessarily a linear function of the angle coupling voltage applied to its cathode; and (2) the normally exponential form of the potential of condenser C6503 as it discharges through resistance R6505. These factors can readily be selected to give a clipping line HJ which is very nearly straight. Adjustment of the level and angle of this line has already been described.

Turning now to the elevation delay multivibrator, which comprises tube V6504, sections a and b (Fig. 15), the basic connections are entirely analogous to those of the azimuth delay multivibrator just described. However, the grid of the normally conducting tube section b is connected through variable resistance R6529 to ground rather than to a potential related to the scan angle. Adjustment of this resistor controls the rate of discharge of condenser C6512, determining the gate length. The gate length determines the time after the basic trigger at which a clipping trigger is transmitted through condenser C6508 and via line 181 to clipping multivibrator V6505, and thus determines the clipping time, as already described. In the elevation display (Fig. 5) this determines the sweep length to the point of clipping, say E, the distance O₂E being shorter the smaller the resistance R6529. The elevation angle coupling voltage is brought by line 186 to the grid of the amplifying tube V6503b, the plate of which is directly connected to the plate of tube V6504b, so that resistance R6526 acts as a plate resistor for both tubes. The cathode of tube V6503b is variably biased by potentiometer R6532 so that when the angle controlled voltage on the grid exceeds a predetermined value the tube conducts. The resulting voltage drop through plate resistance R6526 reduces the plate voltage of tube V6504b to a low enough level to stop the elevation delay multivibrator from operating. When this happens no trigger is generated and the clipping multivibrator V6505 does not operate. In the elevation display (Fig. 5) the clipping line EF breaks off at point F at the scan angle at which the angle coupling voltage is just sufficient to block the clipping operation in this way. The angle at which this occurs is controlled by varying the cathode bias of tube V6503b with potentiometer R6532. As the cathode is made more positive the tube becomes conducting at a more positive angle coupling voltage and the clipping line FG is therefore rotated counterclockwise about point O₂, and makes a greater angle with the time base axis O₂E. Therefore, line FG can readily be made horizontal by adjustment of R6532. Since FG is a sweep path, no special adjustment is needed to insure its being a straight line.

From what has been said, clipping line EF would be parallel to the range lines, rather than inclined to them as shown in Fig. 5. Actually there is some interaction between the control elements. Tube V6503b does not have a completely sharp cut-off, and its plate current increases somewhat with the angle coupling voltage between sweeps O₂E and O₂F. This progressively lowers the plate voltage of delay multivibrator tube V6504b, increasing the gate length and the clipping time and causing line EF to slant as shown in the figure. The angle of this line can be controlled to some extent by choice of tube type and operating conditions of tube V6503b.

The clipping multivibrator itself comprises tube V6505, sections a and b, connected in a conventional multivibrator circuit as shown in Fig. 15. The plates of this multivibrator are supplied with a suitable positive voltage, say 300 volts, as will be described. The clipping trigger is brought in to the grid of the normally conducting tube V6505b by line 181, capacity coupled to the azimuth and elevation delay multivibrators through condensers C6507 and C6508 respectively. The anode 112a of the cathode ray tube is directly connected by line 190 to the plate of multivibrator tube V6505a, the grid of which is normally biased to cut-off. Hence the full plate supply voltage of plus 300 volts is normally applied to the indicator tube anode, giving normal operation of the indicator tube. The clipping trigger shifts the multivibrator to its unstable state, causing tube V6505a to conduct, dropping its plate voltage abruptly to approximately 45 volts, and causing a negative going blanking pulse to be applied to the anode of the indicator tube. The duration of this pulse depends upon the time constant of the multivibrator, and is adjusted, by selection of condenser C6509 and resistance R6522, to such a value that the pulse will be sure to last through the remainder of the sweep in which it occurs, but that the multivibrator will return to its normal condition before the beginning of the succeeding sweep. The grid of tube V6505a is then once more biased to cut-off so that the plate, and also the anode of the indicator tube, receive the full 300 volt supply, returning the indicator tube to normal operation. The succeeding sweep is then clipped in the same way, so long as a clipping trigger is generated in one of the delay multivibrators.

By the use of a shorter time constant in the clipping multivibrator the blanking pulse can be removed before completion of the sweep, either after a fixed time interval or after an interval made dependent upon the scan angle by means similar to those already described for the azimuth delay multivibrator. This allows the production of quite varied clipping patterns by the same general technique.

To produce a clipping pattern which is the inverse of any of those given by the system just described, the lead 190 from cathode ray tube anode 112a is connected to the plate of clipping multivibrator tube V6505 section b instead of section a. Since tube section b is normally conducting, the anode will then normally be held at a relatively low voltage, and it will receive the full 300 volt supply only when the multivibrator is tripped. Thus the display will appear only in those parts of each sweep which, in the system as shown in Fig. 15, are eliminated.

To produce a clipping line controlled by angle only, such as one of the lines $L_2$ in Fig. 11, the clipping multivibrator V6505 can for example be triggered directly by the basic trigger when the scan angle lies within the range to be clipped. This cuts off the indicator tube anode voltage (the anode being connected as shown in Fig. 15) at the start of the sweep and restores it only after the multivibrator returns to its normal state, which is normally after completion of the sweep. When the scan angle is outside the range to be clipped, the clipping multivibrator can be inactivated by means controlled by the angle coupling voltage. This means can be substantially the same as that shown in connection with elevation time delay multivibrator V6504, which is inactivated by the elevation angle coupling voltage acting through injector tube V6503b upon the plate voltage of normally conducting section b of the multivibrator. In fact, neglecting for the moment other aspects of the display, tube V6504, connected in most respects as shown in Fig. 15 and adjusted as already described to give the broken clipping line EFG of Fig. 5, could be used to give instead a straight clipping line $O_2G$ (cutting off the triangle $O_2EF$) by connecting indicator tube anode 112a directly to the plate of section a of tube V6504.

The positive plate voltage for the clipping multivibrator can be supplied from any suitable source, so far as the clipping operation itself is concerned. Fig. 15 shows means by which it can be obtained from the regular plus 300 volt anode supply provided in previous systems for the separate azimuth and elevation indicator tubes. As already explained, each indicator tube was ordinarily blanked out while the other performed a scanning cycle, and also during the shift from one system to the other, this blanking being accomplished by cutting off the anode supply with a blanking switch operated by the antenna scan mechanism. This switch alternately connected the azimuth indicator tube anode to a positive voltage source in the azimuth sweep amplifier system; and connected the elevation indicator tube anode to a similar source in the elevation sweep amplifier system. We provide anode voltage for the combined indicator tube without interfering with simultaneous operation of the separate indicator tubes, by tapping lines leading to both their anodes. However, to avoid the cross connection which would otherwise result between azimuth and elevation sweep amplifiers, we introduce the isolating tube shown at V6506 in Fig. 15. This is used as a double diode, the two cathodes being tied together and connected to the plate resistors of the clipping multivibrator tubes V6505a and b. One plate of the isolator tube is connected via line 97a and blanker switch 94a to the regular azimuth anode supply and the other via line 97e and blanker switch 94e to the regular elevation anode supply. This provides an anode supply for the combined indicator tube without shorting the two regular indicator supplies. The voltage is controlled by the regular blanker switches 94a and 94e (Figs. 7 and 8), and is connected whenever either antenna is in use and disconnected during brief periods while the system is switched between azimuth and elevation scanning, as shown in the region M of the cycle diagram of Fig. 6. The voltage supply is also effectively disconnected, as already described, whenever the clipping multivibrator is tripped.

The production and use of the V-follower lines will now be explained. These are shown in Fig. 5 at $U_1$, $V_1$ in the azimuth display and at $U_2$, $V_2$ in the elevation display. Upper and lower azimuth V-follower lines $U_1$ and $V_1$ extend from sweep origin $O_1$ at angles which correspond to the left and right effective limits of the angular field in azimuth of the elevation radar beam. As the elevation antenna is adjusted in azimuth, by the means shown schematically at 106e in Fig. 7, the V-follower lines in the azimuth display automatically rotate correspondingly about $O_1$. Similarly, as azimuth antenna 90a is adjusted in elevation, by means indicated at 106a, V-follower lines $U_2$ and $V_2$ in the elevation display rotate correspondingly about $O_2$, indicating the effective field in elevation of the azimuth radar beam.

The adjustment of each antenna in the coordinate in which it does not scan is fairly critical, due to the limited angular field of the beam. As a particular target which is being tracked changes its position, it is necessary to readjust the azimuth antenna as the target changes elevation and to readjust the elevation antenna as the target changes azimuth. When V-follower lines are provided, showing the limits of effective coverage of each antenna, the operator has only to manipulate each antenna adjustment until the pair of V-follower lines in the other display encloses the spot P representing the selected target. Thus the V-follower lines as drawn in Fig. 5 indicate correct adjustment of the azimuth antenna because spot $P_2$ lies between lines $U_2$ and $V_2$ in the elevation display; and indicate correct adjustment of the elevation antenna because spot $P_1$ lies between lines $U_1$ and $V_1$ in the azimuth display.

The subject of electronically produced V-follower lines is described and claimed in general in the copending patent application (mentioned above) of A. L. Kelsey, A. L. Hiebert, H. G. Tasker and W. E. Osborne, Serial No. 723,364, filed January 21, 1947. In the present application we are particularly concerned with the means by which V-follower circuitry of the sort there described is adapted to provide two sets of V-follower lines in a single indicator tube, each set representing the position of a separate antenna.

Typical means for producing one set of V-follower lines will first be described, and this description will be based, for the sake of definiteness, upon the set of lines which appears in the elevation display and which represents the elevation angle of the azimuth antenna.

Referring first especially to Fig. 7, an elevation angle coupling voltage is developed as already described by means indicated at 105e. This voltage has a definite value corresponding to each value of the scan angle of the elevation antenna, and determining, as already described, the value of the corresponding sweep angle in the elevation display. In addition to this coupling voltage, one or more V-follower voltages are developed by means indicated schematically at 107a, linked to the elevation adjustment of the azimuth antenna, each such voltage having a definite (but not the same) value for each adjustment setting. For example two such V-follower voltages may be used, one corresponding to the upper and one to the lower effective limit of the angular field in elevation of the azimuth radar beam. This correspondence between voltage and angle can be, for example, and will here be assumed to be, the same as the correspondence between the elevation angle coupling voltage and the scan angle of the elevation antenna.

Circuit means are provided by which each such V-follower voltage is separately compared with the elevation angle coupling voltage, and by which a sweep path is rendered visible on the elevation indicator tube whenever the two voltages compared are (in the present instance) equal. Thus, as the elevation sweep angle varies during a scan, the elevation angle coupling voltage becomes equal to first one and then the other of the azimuth V-follower voltages, and in each instance a sweep path is made visible on the screen. The angles of the two resulting lines will correspond to the momentary angle coupling voltages and hence to the two limits of the angular field in elevation of the azimuth antenna. A single line can be used instead of the two lines just described, representing for example the axis of the radar beam; or more than two lines can be used, the necessary modifications in either instance being obvious.

Fig. 17 shows typical circuiting for comparing voltages as just described and for rendering the cathode beam visible during a sweep in response to the existence of a predetermined relationship between them. The various functional sections of the circuitry are enclosed by dashed lines, corresponding to the functional boxes shown at 200 and at 121 in Fig. 8. The illustrative detailed circuitry thus designated and now to be described is not in itself a part of the present invention. The input angle coupling voltage is supplied over lines 201 to the grid of comparison tube V2 in first comparison and trigger 203; and to the grid of comparison tube V4 in second comparison and trigger 204. The cathode voltages of the two comparison tubes are controlled respectively by the input first and second V-follower voltages, supplied over lines 205 and 206. The V-follower voltages can in principle be applied directly to the cathodes, but are preferably applied as indicated in Fig. 17 via cathode follower injector tubes V1a and V1b. The grid bias of comparison tube V2 (and hence the voltage drop across it) is then determined jointly by the angle coupling voltage connected to its grid and by the first V-follower voltage applied through injector tube V1a to its cathode. Similarly the voltage drop across comparison tube V4 is determined jointly by the angle coupling voltage and the second V-follower voltage. During the course of alternate scans in which the angle coupling voltage becomes gradually more negative, the voltage drop across each comparison tube gradually increases, its value at a given scan angle depending upon the relatively constant value of the associated V-follower voltage.

Gas tubes V3 and V5 are connected respectively in parallel with comparison tubes V2 and V4. When the voltage drop across comparison tube V2 or V4 increases during a scan to the critical voltage of the parallel-connected gas tube, the latter fires, causing a sharp reduction of its plate voltage. This voltage change is differentiated by condenser 210 or 211 and is transmitted as a negative trigger over lines 212 to multivibrator 215. Each such negative trigger transmitted to the multivibrator results (as will be described) in the appearance of a V-follower line on the screen of indicator tube 112 at an angle which corresponds to the momentary value of the angle coupling voltage. By appropriate selection of tube characteristics and circuit constants in the comparison and trigger units, each gas tube can be made to fire when the angle coupling voltage equals the associated V-follower. The angle of the resulting V-follower line on the screen will then correspond to the value of the V-follower voltage.

Multivibrator 215 employs tube V6 in a conventional circuit such that tube section $b$ is normally conducting and section $a$ non-conducting. When a negative trigger, generated as just described, is applied over lines 212 to the grid of tube section $b$, the multivibrator is shifted to its unstable state with section $b$ cut off and section $a$ conducting. After a predetermined time interval, depending primarily upon the time required for condenser 220 to discharge through resistance 221, the multivibrator returns to its stable state. This action generates a positive voltage gate of predetermined length which is taken from the grid of section $a$ of tube V6 and transmitted over line 224 to the grid of tube V7 of oscillator and amplifier 225. For reasons which will appear, the gate length of multivibrator 215 is preferably made somewhat longer than the total sweep period of the indicator tube.

Section $a$ of tube V7 is connected in a conventional oscillator circuit of suitable frequency, with the tube grid normally biased below cut-off. The positive voltage gate from multivibrator 215, applied via line 224 to the grid of tube V7 section $a$, makes the tube section conducting and sets up oscillations in the tuned oscillator circuit. The oscillations continue only for the duration of the gate. During the short determined period that the oscillator is operating, a high frequency signal is transmitted through condenser 216 to the grid of cathode follower tube V7 section $b$. This tube section is so biased as to act as a rectifier, transmitting only a predetermined fraction of the positive peaks of the signal. The rectified signal, which consists of relatively sharp and clearly separated positive going peaks, is transmitted over line 226 to the cathode of tube V8 in intensity clipper 121.

Tube V8 is part of the previously known system, its normal function being to clip the amplified intensifying gate, supplied over line 228, which is then applied, as already described, via line 235 to grid 112g of the indicator tube, bringing it to cut-off for the duration of each sweep. The intensifying gate, generated and amplified in the usual way (at 111 and 120 in Fig. 8) is applied as a positive going pulse over line 228 and through resistor 230 and condenser 231 to the plate of clipping tube V8. This tube is connected as a diode with its plate normally held below cut-off by connection through resistance 233 to a source of negative voltage. When the plate voltage is raised by the intensifying gate, the tube becomes conducting, and the resulting flow of current holds the plate at a definite voltage above the cathode, which in previous systems is usually grounded. The somewhat irregular form of the intensifying gate is thus transformed into an accurately flat-topped wave form suitable for application via line 235 to the indicator tube grid 112g.

When the V-follower system is applied, the action of tube V8 is like that described whenever oscillator V7 is inactive. However, since the cathode of tube V8 is connected by line 226 to the cathode of tube V7 section b, it receives the positive going pulses generated in tube V7 as explained. In the absence of an intensifying gate these pulses are blocked by tube V8, but when the diode is made conducting by the gate the pulses are transmitted through the tube and are superposed upon the normally flat top of the gate. Each pulse so added to the gate voltage brings indicator tube grid 112g above cutoff, thus making the cathode beam momentarily visible on the screen. Since the beam is sweeping across the screen (the gate coincides with a sweep), this results in a series of visible dots or dashes along the sweep path, each dot corresponding to one peak of the oscillations of the tuned circuit associated with tube V7 section a. The spacing of the dots depends upon the frequency of the tuned oscillator circuit. A row of dots thus appears on the screen along the path of any sweep which occurs while multivibrator tube V6 is in its unstable state. Adjustment of the time constant of multivibrator 215 to give a gate slightly longer than one complete sweep period insures that, regardless of the point in the sweep cycle at which the multivibrator happens to be triggered, there will always appear at least one complete row of dots and not more than two.

In providing V-follower lines in previous two-coordinate radar systems, two sets of circuits like that shown in Fig. 17 and described above are ordinarily used, an azimuth set associated with the azimuth indicator tube and an elevation set associated with the elevation indicator tube. Reference is had to the identified co-pending application for a more complete description of the elements of the system and its general application.

According to the present invention both sets of V-follower lines, each in correct relation to its display, are shown on the screen of a single indicator tube. This is preferably accomplished with a single system of V-follower circuitry, such for example as that just described, by providing switching means by which the input voltages to this system are switched in accordance with the display being shown. While the azimuth antenna is scanning and the azimuth display is being shown, the input voltages fed to the V-follower system are those appropriate to an azimuth V-follower system; and while the elevation antenna is scanning, the V-follower system receives input voltages appropriate to an elevation V-follower system.

Switching means by which this can be accomplished are shown schematically in Figs. 8 and 17. The first and second comparison and trigger circuits 203 and 204 receive the same input angle coupling voltage via lines 201 from switch m of relay K1104; circuit 203 receives its input V-follower voltage via line 205 from switch m of relay K1103; and circuit 204 receives its input V-follower voltage via line 206 from switch n of relay K1103. During the azimuth antenna scan the relays are actuated by closure of switch 100, as already described, and during the elevation antenna scan the relays are unactuated. As shown in Figs. 8 and 17 (in which the relays are in unactuated position), the coupling voltage supplied to the V-follower circuits during the azimuth scan comes via line 185 from azimuth coupling voltage generator 105a, and during the elevation scan it comes via line 186 from elevation coupling voltage generator 105e; and the V-follower voltages supplied to the circuits 203 and 204 come during the azimuth scan via lines 241 and 242 respectively from 107e associated with the elevation antenna; and during the elevation scan via lines 243 and 244 respectively from 107a associated with the azimuth antenna (Fig. 7). Thus in each instance the V-follower lines produced on the screen are at angles appropriate to the display being produced.

An alternative arrangement according to the present invention, makes use of two sets of V-follower circuitry (each set including for example 203, 204, 215 and 225 of Fig. 17), an azimuth set regularly supplied with azimuth angle coupling voltage from 105a and with elevation V-follower voltages from 107e, and an elevation set regularly supplied with elevation angle coupling voltage from 105e and with azimuth V-follower voltages from 107a. A relay switch or its equivalent is introduced into the line 226 leading to the cathode of intensity clipping tube V8, and is so operated that this tube cathode is connected during an azimuth scan to the output of the azimuth set and during an elevation scan to the output of the elevation set. Although such an arrangement is in some respects equivalent to the arrangement illustrated, the latter is preferred, primarily because of its greater economy and simplicity.

A simplified modification of our invention, such for example as that illustrated in Figs. 18 and 19, is useful in certain applications, particularly when it is necessary or desirable to hold the instrumentation to a minimum. This modification retains many of the advantages of the preferred form, already described. It provides an illustration of the variety of detailed embodiments which are embraced within the scope of the invention.

The dual display in Fig. 19 differs in four principal respects from the preferred form of showing in Fig. 5, each of these differences being associated with a corresponding difference between the circuitry of Fig. 18 and that of Fig. 8.

First, the origins of the two displays are at a common point O in Fig. 19, rather than at two distinct and separately adjustable points $O_1$ and $O_2$ as in Fig. 5. The corresponding simplification from the preferred circuitry of Fig. 8 is the elimination of relay K1102 and the associated separate azimuth and elevation adjustments for each of the centering circuits 126 and 127. Thus the two potentiometers R1158 and R1159 of the typical centering circuit shown in Fig. 9 may be replaced by a single potentiometer for adjusting the grid bias of centering tube V1117, as in a conventional centering circuit. This single adjustment in the expansion centering circuit 126 then controls the vertical position of point O in Fig. 9 during the showing of both azimuth and elevation displays. Similarly, the horizontal position of point O in both displays is controlled by an analogous single adjustment in time base centering circuit 127. Even with patterns of the type in Fig. 19 the use of separately adjustable origins for the two displays offers advantages such as clarity of reading. These can be provided when desired by such means as have been described in connection with Fig. 5.

The second primary difference in Fig. 19 is the fact that neither azimuth nor elevation display needs to be clipped to avoid overlapping the other. This permits simplification of the associated circuitry if desired by elimination of the pattern clipping circuits 140 of Fig. 8 (shown in typical detail in Fig. 15), including switch $n$ of relay K1104. As shown in Fig. 18, lines 97a and 97e from blanker switches 94a and 94e are then connected directly to line 199 which leads to anode 112a of indicator tube 112.

In the third place, the V-follower lines ($U_1$, $V_1$ and $U_2$, $V_2$ in Fig. 5) are omitted from the showing. Correspondingly, the entire V-follower circuiting 200, switch $m$ of relay K1104, both switches of relay K1103 and V-follower voltage generators 107a and 107e (see Figs. 7, 8 and 17) are all omitted from the simplified circuitry of Fig. 19. This simplification is independent of the other features of the simplified modification, and if desired V-follower lines may be included in a showing of the type of Fig. 19. Circuitry such as that already discussed and illustrated in Fig. 18 is suitable for this purpose.

The fourth point of primary distinction between Fig. 19 and Fig. 5 is the general arrangement of the two displays, which occupy different sectors about the common origin O. The elevation display occupies the lower sector $dOe$, which corresponds generally to the area $DO_2EFG$ of Fig. 5; and the azimuth display occupies the upper sector $hOk$, corresponding generally to area $JHO_1K$ of the preferred form. The adjacent boundaries of the two displays, radial lines $Od$ and $Ok$, are shown somewhat separated, but by appropriate adjustments of the circuits these boundaries can readily be brought together if desired. The lower boundary $Oe$ of the elevation display and the upper boundary $Oh$ of the azimuth display preferably coincide with sweep paths corresponding respectively to deflection of the electron beam by the time base deflection coils 114 alone and by the expansion deflection coils 113 alone.

The deflection coils, with their corresponding axes, circuits, etc., will hereafter be referred to as horizontal and vertical rather than time base and expansion, respectively, since the distinction between the latter two terms loses a part of its usual significance in patterns of the type now being discussed. The designations horizontal and vertical are selected for convenience of description, but without meaning to imply any limitation upon the orientation of the cathode ray tube.

The sweep circuitry used to generate the showing of Fig. 19 is not necessarily different from that used for the showing of Fig. 5, only the circuit adjustments requiring change, and the sweep circuitry section of Fig. 18 will be seen to be much the same as that of Fig. 8. In addition to the absence of centering relay K1102, already discussed, the sweep circuitry in Fig. 18 differs from Fig. 8 in showing cathode followers 138 and 139 introduced between the angle coupling voltage generators 105a and 105e and the upper and lower contacts of switch $m$ of relay K1101; and also introducing potentiometers 134a, 135a, 136a and 137a in the various angle coupling voltage connections to both switches of relay K1101.

These elements provide greater flexibility in the control of sweep modulators 122 and 123 as will be described. They can be, and preferably are, included also in the sweep circuits of the preferred modification, although they are not shown explicitly in Fig. 8.

In Fig. 19 the elevation showing itself is substantially unchanged from that of Fig. 5, requiring only minor changes even in the adjustments of the circuits. On the other hand, the azimuth display in Fig. 19 is rotated through approximately 45 degrees about its origin as compared to the corresponding display in Fig. 5. This reorientation of the display with respect to the deflection axes of the cathode ray tube is obtained in the particular illustrative modification here described by appropriate settings of the potentiometers 136, 136a, 137 and 137a, which control the sweep modulators 122 and 123 during the azimuth display. The action of those four potentiometers during the azimuth display (that is, while relay K1101 is actuated) is entirely analogous to the action of the corresponding controls in previous radar systems using separate cathode ray tubes for azimuth and elevation displays.

As the contacts of potentiometers 136 and 137 are moved away from the grounded end (upward in Fig. 18), the degree of modulation of the sweep current amplitudes is increased, without greatly affecting the values of the amplitudes for zero angle coupling voltage (for which the potentiometer currents are approximately zero). As the contacts of potentiometers 136a and 137a are moved toward more positive values (toward each other in Fig. 18), the modulators tend to increase the sweep current amplitudes at all values of the coupling voltage. At the same time, the degree of modulation is somewhat increased, but this can be compensated by readjustment of potentiometers 136 and 137. Thus it is possible by coordinated adjustment of 136 and 136a, etc., to modify independently the general level of the sweep current amplitude and the degree of modulation of this current by the coupling voltage.

Fig. 20 is a schematic plot of deflection current amplitude against azimuth angle coupling voltage, representing the condition of adjustment of the vertical and horizontal modulator controls for an azimuth display of the type shown in Fig. 5 (solid lines) and for an azimuth display of the type shown in Fig. 19 (dashed lines). In the former case, azimuth vertical modulator controls 136 and 136a are so adjusted that the vertical sweep current is substantially zero for zero angle coupling voltage (point 1 of Fig. 20), and increases to a moderate value at maximum coupling voltage (point 2); and azimuth horizontal modulator controls 137 and 137a are so adjusted that the horizontal sweep current has its maximum value at zero coupling voltage (point 3) and decreases to a value close to that of the vertical current at maximum coupling voltage (point 4). This results in a sweep path along $O_2E$ (projected beyond clipping point E) in Fig. 5 for zero coupling voltage, and along $O_2H$ (projected) for maximum coupling voltage.

To produce an azimuth display such as that in Fig. 19, azimuth vertical modulator controls 136 and 136a are set to give a vertical sweep current which has an intermediate value for zero coupling voltage (point 5 of Fig. 20) and increases to its maximum value for maximum coupling voltage (point 6); and azimuth horizontal controls 137 and 137a are set to give a horizontal sweep current which approximates the vertical current for zero coupling voltage (point 7) and decreases to zero for maximum coupling voltage (point 8). The resulting sweep paths are then along O$k$ in Fig. 19 for zero coupling voltage and along O$h$ for maximum coupling voltage.

The relative amplitudes of the vertical and horizontal sweep currents for zero coupling voltage determine the angle of line O$k$, and the interval between lines O$k$ and O$d$ can thus be adjusted at will; while the absolute amplitudes of these two sweep currents determine the spacing of range lines R$_1$ along sweep O$k$. These are preferably adjusted so that the points of intersection of range lines R$_1$ with sweep path O$k$ in the azimuth display are immediately adjacent the intersections of corresponding range lines R$_2$ with sweep path O$d$ of the elevation display, as indicated in Fig. 19. Such a correspondence of range lines facilitates identification of the images (as P$_1$ and P$_2$) in the two displays which correspond to a single aircraft.

An alternative detailed circuiting for producing the azimuth display of a showing such as that in Fig. 19 feeds the azimuth angle coupling voltage through an inverter, such as 131, to vertical modulator 122; and through a non-inverting circuit, such as cathode follower 138, to the horizontal modulator; rather than vice versa as in the circuiting shown in Fig. 18. To give a correct mapping of the azimuth angle in the display, such a change of circuiting is accompanied by a complete inversion of the azimuth angle coupling voltage, for example by modification of the wiring or mechanical connection of coupling voltage generator 105$a$. Such a mechanical modification of 105$a$ is indicated schematically in Fig. 7$a$, in which the direction of rotation of 105$a$ for a given direction of scanning of antenna 90$a$ has been reversed as compared with Fig. 7.

The modification just described has the advantage that the two kinds of sweep current which require the most modulation (vertical deflection current during the elevation showing and horizontal current during the azimuth showing) are both provided with angle coupling voltage through similar circuits, for example cathode followers 138 and 139; and the sweep currents which require only moderate modulation (horizontal deflection current during the elevation showing and vertical deflection current during the azimuth showing) are also provided with angle coupling voltage via similar circuits, for example inverters 130 and 131.

The above described embodiments of our invention are presented as an illustration of its application under certain definite conditions, for the purpose of giving a clear understanding of the invention. However, the scope of the invention is not intended to be limited by the particular embodiments selected for illustration, but is defined by the following claims.

We claim:

1. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages, the first and second control voltages varying with the same period, and the period of operation of the control means being such that one of the two last mentioned periods is an integral multiple of the other.

2. A multiple display system as defined in claim 1 and in which the first and second control voltages vary with the same period and approximately ninety degrees out of phase with each other, and the cyclic period of operation of the control means is one-half of that period.

3. A multiple display system as defined in claim 1 and in which the said second sweep circuit means comprises means for deriving from the said series of voltage pulses a periodic series of sweep pulses, means for modulating the said sweep pulses in accordance with the said sweep modulating voltage and means for supplying the pulses after such modulation as sweep pulses to the other ray deflector element, to progressively vary the angle of successive sweep paths on the screen in accordance with the relative magnitudes of the sweep pulses applied to the two ray deflector elements.

4. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and also including zeroing circuit means for applying steady voltages to the two ray deflector elements and including switchable controls for selectively applying to at least one of those elements either of two different predetermined steady voltages, to determine two alternative and relatively displaced normal ray positions from which the ray is periodically moved, and control means for periodically shifting the switchable controls of the said zeroing circuit means synchronously with the said periodic switching of the switchable circuit means.

5. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from the voltage pulses a periodic series of sweep pulses and for modulating said sweep pulses in accordance with a first modulating voltage and for supplying the pulses after such modulation to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which voltages derived selectively from either one or other of the control voltages are supplied as the first and second sweep modulating voltages to the said first and second sweep circuit means respectively, and control means for periodically shifting the switchable circuit means between its two alternative conditions in definite time relation to the periodic variation of the control voltages and also including zeroing circuit means for applying steady voltages to the two ray deflector elements and including switchable controls for selectively applying to at least one of those elements either of two different predetermined steady voltages, to determine two alternative and relatively displaced normal ray positions from which the ray is periodically moved, and control means for periodically shifting the switchable controls of the said zeroing circuit means synchronously with the said periodic switching of the switchable circuit means.

6. A multiple display system, comprising a cathode ray tube having electrodes for energizing the tube to project its cathode ray and having two ray deflector elements for determining, in response to voltage applications thereto, the respective positions of the cathode ray in two deflection coordinates in the plane of the tube screen, circuit means for developing a periodic series of voltage pulses, sweep circuit means for developing two sweep pulses in response to each of the said pulses, for supplying the sweep pulses to the respective ray deflector elements to deflect the ray along a sweep path from a zero position on the tube screen, and for modulating the sweep pulses supplied to at least one of the ray deflector elements in accordance with a sweep modulation voltage to determine the angle of the sweep path on the tube screen, means for generating two distinct control voltages that vary periodically with periods long compared to the period of the voltage pulses, and for providing either one of those control voltages selectively to the sweep circuit means as a sweep modulation voltage to produce on the tube screen selectively either one of two periodically repeated, two-dimensional patterns of successive sweep paths, means for controllably and independently shifting the positions on the tube screen of the boundaries of the respective patterns so that the patterns are substantially adjacent along a substantially common boundary, and means for controllably modifying the sweep modulation voltage for at least one pattern so that the respective sweep times of the cathode ray are equal in the two patterns from the respective zero positions to all pairs of points of the respective patterns oppositely adjacent the said common boundary.

7. In a multiple display radar system, the combination of antenna means for directed radar beam radiation and for varying the direction of beam radiation to produce periodic scansion movements of the beam alternatively in two scansion coordinates, means for developing two scansion representing voltages which vary respectively in accordance with the scansion position of the radiated beam in the two scansion coordinates, a cathode ray tube having two ray deflector elements for determining, in response to voltage applications thereto, the respective positions of the cathode ray in two deflection coordinates in the plane of the tube screen, circuit means for developing a periodic series of voltage pulses, first sweep circuit means for deriving from the said voltage pulses a series of sweep pulses and for supplying the derived sweep pulses to one ray deflector element to move the ray periodically from a normal position in the direction of the corresponding deflection coordinate and thereby to describe a sweep path on the screen, second sweep circuit means for supplying to the other ray deflector element voltages which are modulated in accordance with a sweep modulating voltage to displace successive sweep paths progressively in the direction of the other deflection coordinate, switchable circuit means shiftable between two alternative conditions in which a voltage derived selectively from either one or other of the two scansion representing voltages is utilized as sweep modulating voltage in the said second sweep circuit means, and control means for periodically shifting the switchable circuit means between its two alternative conditions in such predetermine time relation to the periodic scansion movements of the radiated beams that the scansion representing voltage that is utilized for modulation of the position of each sweep path corresponds to the scansion position of the radiated beam in that scansion coordinate in which the beam is scanning, and also including zeroing circuit means for applying steady voltages to the two ray deflector elements and including switchable controls for selectively applying to at least one of those elements either of two different predetermined steady voltages, to determine two alternative and relatively displaced normal ray positions from which the ray is periodically moved, and control means for periodically shifting the switchable controls of the said zeroing circuit means synchronously with the said periodic switching of the switchable circuit means.

8. In a multiple display radar system, the combination of antenna means for directed radar beam radiation and for varying the direction of beam radiation to produce periodic scansion movements of the beam alternatively in two scansion coordinates, means for developing two scansion representing voltages which vary respectively in accordance with the scansion position of the radiated beam in the two scansion coordinates, a cathode ray tube having two ray deflector elements for determining, in response to voltage applications thereto, the respective positions of the cathode ray in two deflection coordinates in the plane of the tube screen, circuit means for developing a periodic series of voltage pulses, first sweep circuit means for deriving from the said voltage pulses a series of sweep pulses and for supplying the derived sweep pulses to one ray deflector element to move the ray periodically from a normal position in the direction of the corresponding deflection coordinate and thereby to describe a sweep path on the screen, second sweep circuit means for deriving from the said series of voltage pulses a periodic series of sweep pulses, for modulating the said sweep pulses in accordance with a sweep modulating voltage, and for supplying the pulses after such modulation as sweep pulses to the other ray deflector element, to progressively vary the angle of successive sweep paths on the screen in accordance with the relative magnitudes of the sweep pulses applied to the two ray deflector elements, switchable circuit means shiftable between two alternative conditions in which a voltage derived selectively from either one or other of the two scansion representing voltages is utilized as sweep modulating voltage in the said second sweep circuit means, and control means for periodically shifting the switchable circuit means between its two alternative conditions in such predetermined time relation to the periodic scansion movements of the radiated beams that the scansion representing voltage that is utilized for modulation of the angle of each sweep path corresponds to the scansion position of the radiated beam in that scansion coordinate in which the beam is scanning and also including, zeroing circuit means for applying steady voltages to the two ray deflector elements and including switchable controls for selectively applying to at least one of those elements either of two different predetermined steady voltages, to determine two alternative and relatively displaced normal ray positions from which the ray is periodically moved, and control means for periodically shifting the switchable controls of the said zeroing circuit means synchronously with the said periodic switching of the switchable circuit means whereby the sweep paths generated in correspondence to the scanning position of the radiated beam in the respective scansion coordinates radiate from two relatively displaced normal ray positions on the screen.

9. A multiple display system for use with a two-coordinate radar system of the type which includes, two beam radiating antennas and means for periodically and alternately oscillating their radiated beams through definite scansion intervals in respective scansion coordinates, means for developing two scansion representing voltages which respectively vary in accordance with the scansion positions of the two radiated beams during their periodic scansion movements, circuit means for developing a period series of voltage pulses, means for generating radio frequency energy pulses in response to said voltage pulses and for supplying the energy pulses to that one of the two antennas which is scanning, to radiate a pulsed radar beam, and means for receiving and amplifying echoes of the pulsed beam; said multiple display system comprising, a cathode ray tube having electrodes for energizing the tube to project its cathode ray and having two ray deflector elements for determining, in response to voltage applications thereto, the respective positions of the cathode ray in two deflection coordinates in the plane of the tube screen, first sweep circuit means for deriving from said voltage pulses a series of sweep pulses and for supplying the derived sweep pulses to one ray deflector element to move the ray periodically from a normal ray position in a series of time representing sweep paths in the direction of the corresponding deflection coordinate, second sweep circuit means for deriving from the said series of voltage pulses a periodic series of sweep pulses, for modulating the said sweep pulses in accordance with a sweep modulating voltage, and for supplying the sweep pulses after such modulation to the other ray deflector element to progressively vary the angle of successive sweep paths on the screen in accordance with the relative magnitudes of the sweep pulses applied to the two ray deflector elements, switchable circuit means shiftable between two alternative conditions in which a voltage derived selectively from either one or other of the two scansion representing voltages is utilized as sweep modulating voltage in the said second sweep circuit means, zeroing circuit means for applying steady voltages to the two ray deflector elements and including switchable controls for selectively applying to at least one of those elements either of two different predetermined steady voltages, to determine two alternative and relatively displaced normal ray positions from which the ray is periodically moved, control means for periodically shifting the switchable circuit means between its two alternative conditions and simultaneously shifting the switchable controls of the zeroing circuit means in synchronism with the alternating scansion movements of the two antennas, and circuit means for applying to one of the tube electrodes tube energizing voltages in response to the amplified echoes of the pulsed beam during scansion movements of both antennas.

10. A two-coordinate radar system comprising in combination, two beam radiating antennas and means for periodically oscillating their radiated beams through definite scansion intervals in two different scansion coordinates, means for developing two scansion representing voltages which respectively vary in accordance with the scansion positions in their respective coordinates of the two radiated beams during their periodic scansion movements, circuit means for developing a periodic series of voltage pulses, means for generating radio frequency energy pulses in response to said voltage pulses, a cathode ray tube having electrodes for energizing the tube to project its cathode ray and having two ray deflector elements for determining, in response to voltage applications thereto, the respective positions of the cathode ray in two deflection coordinates in the plane of the tube screen, sweep circuit means for developing two sweep pulses in response to each of the said voltage pulses, for supplying the sweep pulses to the respective ray deflector elements to deflect the ray along a sweep path from a zero position on the tube screen, and for modulating the amplitude of the sweep pulses supplied to at least one of the ray deflector elements in accordance with a sweep modulation voltage to determine the angle of the sweep path on the tube screen, first switching means capable of two alternative conditions in which the radio frequency energy pulses are supplied selectively to the first and second antennas, respectively, to radiate a pulsed radar beam, second switching means capable of two alternative conditions in which the scansion representing voltages of the first and second antennas, respectively, are supplied selectively as sweep modulation voltage to the sweep circuit means, and control means for simultaneously shifting the said first and second switching means between their respective first conditions and their respective second conditions.

11. In a display system of the electronic type which embodies a cathode ray tube, a circuit and electrodes for energizing the tube to project its cathode ray, two ray deflection elements adapted upon variant voltage supply to deflect the cathode ray transversely in two co-ordinates in the plane of the tube screen, first sweep circuit means for supplying to at least one of the elements a series of voltage sweep pulses each of time increasing form, and second sweep circuit means for applying to at least the other of said deflection elements voltages which are modulated in accordance with a periodically varying control voltage, so that upon each voltage pulse the cathode ray is deflected from an origin in the direction of a time base axis and is progressively deflected on succeeding pulses laterally of that axis in scansion in accordance with the varying control voltage; a system for controlling the area of the deflection pattern of the cathode ray, comprising the combination of, a voltage source, a switching circuit connected between the voltage source and one of the tube electrodes, said switching circuit having two alternative conditions in which either a tube energizing voltage or a tube blanking voltage is supplied to the said tube electrode and being adapted on pulse actuation to change from one condition to the other, and a timing circuit initiated in action in definite time relation to each of the succeeding sweep producing voltage pulses, said timing circuit including a settable time control and acting to deliver an actuating pulse to the alternative-condition circuit at the end of a set time period after timing initiation and also including, circuit means controllingly associated with the timing circuit and controlled in action by the said control voltage and acting to set the settable time control in accordance with the control voltage.

12. In a display system of the electronic type which embodies a cathode ray tube, a circuit and electrodes for energizing the tube to project its cathode ray, two ray deflection elements adapted upon variant voltage supply to deflect the cathode ray transversely in two co-ordinates in the plane of the tube screen, circuit means for supplying to both ray deflection elements series of simultaneous voltage pulses, and associated circuit means whereby a varying control voltage is utilized to progressively modulate the series of voltage pulses supplied to at least one of the deflection elements, so that upon each pair of voltage pulses the cathode ray is deflected from an origin in a direction with respect to the coordinates which depends upon the relative amplitudes of the pulses applied to the two deflector elements; a system for controlling the area of the deflection pattern of the cathode ray, comprising the combination of, a voltage source, a switching circuit connected between the voltage source and one of the tube electrodes, said switching circuit having two alternative conditions in which either a tube energizing voltage or a tube blanking voltage is supplied to the said tube electrode and being adapted on pulse actuation to change from one condition to the other, and a timing circuit initiated in action in definite time relation to each of the succeeding sweep producing voltage pulses, said timing circuit including a settable time control and acting to deliver an actuating pulse to the alternative condition circuit at the end of a set time period after timing initiation and also including, circuit means controllingly associated with the timing circuit and controlled in action by the said control voltage and acting to set the settable time control in accordance with the control voltage.

13. In a display system of the electronic type which embodies a cathode ray tube, a circuit and electrodes for energizing the tube to project its cathode ray, two ray deflection elements adapted upon variant voltage supply to deflect the cathode ray transversely in two co-ordinates in the plane of the tube screen, first sweep circuit means for supplying to at least one of the elements a series of voltage sweep pulses each of time increasing form, and second sweep circuit means for applying to at least the other of said deflection elements voltages which are modulated in accordance with a periodically varying control voltage, so that upon each voltage pulse the cathode ray is deflected from an origin in the direction of a time base axis and is progressively deflected on succeeding pulses laterally of that axis in scansion in accordance with the varying control voltage; a system for controlling the area of the deflection pattern of the cathode ray, comprising the combination of, a voltage source, a switching circuit connected between the voltage source and one of the tube electrodes, said switching circuit having two alternative conditions in which either a tube energizing voltage or a tube blanking voltage is supplied to the said tube electrode and being adapted on pulse actuation to change from one condition to the other, and a timing circuit initiated in action in definite time relation to each of the succeeding sweep producing voltage pulses, said timing circuit including a settable time control and acting to deliver an actuating pulse to the alternative-condition circuit at the end of a set time period after timing initiation and also including circuit means controllingly associated with the timing circuit and controlled in action by the control voltage and acting to interrupt the said action of the time control within a definite portion of the range of variation of the control voltage.

14. A system for controlling the area of a scansion pattern on the screen of a cathode ray tube, said system comprising, a cathode ray tube having two ray deflector elements for determining, in response to voltage applications thereto, the respective positions of the cathode ray in two co-ordinates in the plane of the tube screen, circuit means including a voltage source and tube electrodes for energizing the tube to project its cathode ray, circuit means for developing a periodic series of voltage trigger pulses, circuit means for developing a control voltage which varies periodically through a definite predetermined range with a period which is long compared to the period of the said trigger pulses, first sweep circuit means for deriving from said trigger pulses a periodic series of sweep pulses and for supplying the derived sweep pulses to one ray deflector element to move the ray periodically from a normal ray position in the direction of the corresponding coordinate and thereby to describe a sweep path on the screen, second sweep circuit means for supplying to the other ray deflector element voltages which are modulated in accordance with the said scansion representing voltage to displace successive sweep paths progressively in the direction of the other coordinate, switching circuitry connected between the voltage source and a tube electrode and capable of two alternative conditions in which a tube energizing voltage and a tube blanking voltage are selectively applied to the tube electrode, said switching circuitry acting in response to an applied energizing voltage to shift from one condition to the other in response to an applied actuating voltage pulse and shifting back to its original condition after a predetermined time interval, circuit means for applying to the switching circuitry actuating pulses having a definite time relation to the said sweep pulses, and circuit means controlled in action by the said control voltage and acting to apply to the switching circuitry an energizing voltage when the control voltage is within a predetermined limited portion of its range of periodic variation.

15. In a display system of the electronic type which embodies a cathode ray tube, a circuit and electrodes for energizing the tube to project its cathode ray, two ray deflection elements adapted upon variant voltage supply to deflect the cathode ray transversely in two coordinates in the plane of the tube screen, first sweep circuit means for supplying to at least one of the elements a series of voltage sweep pulses each of time increasing form, and second sweep circuit means for applying to at least the other of said deflection elements voltages which are modulated in accordance with a periodically varying control voltage, so that upon each voltage pulse the cathode ray is deflected from an origin in the direction of a time base axis and is progressively deflected on succeeding pulses laterally of that axis in scansion in accordance with the varying control voltage; a system for controlling the area of the deflection pattern of the cathode ray, comprising the combination of a voltage source, switchable circuit means connected between the voltage source and a tube electrode, said circuit means including a multivibrator circuit capable alternatively of relatively stable and relatively unstable electrical conditions in which either a tube energizing voltage or a tube blanking voltage is selectively applied to the tube electrode, said multivibrator circuit shifting from its stable to its unstable condition in response to an applied trigger voltage pulse, and shifting back to its stable condition after a variable time interval which varies in response to a variable applied timing voltage, triggering circuit means for developing a series of voltage pulses having a definite time relation to the sweep pulses and for applying those voltage pulses as trigger pulses to the multivibrator circuit, and timing circuit means for developing a voltage which varies in accordance with variations in the said control voltage and for applying that variable voltage as timing voltage to the multivibrator circuit, all whereby the condition of relative energization of the cathode ray tube is shifted at a time which follows initiation of each succeeding sweep by an interval which varies in accordance with the control voltage.

16. In a display system of the electronic type which embodies a cathode ray tube, a circuit and electrodes for energizing the tube to project its cathode ray, two ray deflection elements adapted upon variant voltage supply to deflect the cathode ray transversely in two coordinates in the plane of the tube screen, first sweep circuit means for supplying to at least one of the elements a series of voltage sweep pulses each of time increasing form, and second sweep circuit means for applying to at least the other of said deflection elements voltages which are modulated in accordance with a periodically varying control voltage, so that upon each voltage pulse the cathode ray is deflected from an origin in the direction of a time base axis and is progressively deflected on succeeding pulses laterally of that axis in scansion in accordance with the varying control voltage; a system for controlling the area of the deflection pattern of the cathode ray, comprising the combination of a voltage source, switchable circuit means connected between the voltage source and a tube electrode, said circuit means including a switching multivibrator shiftable, in response to an actuating voltage pulse, between two alternative electric conditions in which a tube energizing voltage and a tube blanking voltage are selectively applied to the said tube electrode, and a timing circuit including a timing multivibrator capable alternatively of relatively stable and relatively unstable electrical conditions, and shiftable from its stable to its unstable condition in response to each succeeding sweep initiating voltage pulse, and adapted to return to its stable condition and thereby to generate a voltage pulse after a set time interval which varies in response to an applied variable timing voltage, circuit means for applying to the timing multivibrator a timing voltage which varies in accordance with variations in the said control voltage, and circuit means for applying the last said voltage pulse as an actuating pulse to the switching multivibrator, all whereby the condition of energization of the cathode ray tube is shifted at a time which follows initiation of each succeeding sweep by an interval which varies in accordance with the control voltage.

17. A system for controlling the area of the deflection pattern of a cathode ray tube as defined in claim 16, and in which the said timing circuit acts under control of the control voltage to actuate the switching multivibrator only within a predetermined limited portion of the range of variation of the control voltage.

18. A system for controlling the area of a scansion pattern on the screen of a cathode ray tube, said system comprising, a cathode ray tube having two ray deflector elements for determining, in response to voltage applications thereto, the respective positions of the cathode ray in two coordinates in the plane of the tube screen, circuit means including a voltage source and tube electrodes for energizing the tube to project its cathode ray, circuit means for developing a periodic series of voltage trigger pulses, circuit means for developing a control voltage which varies periodically through a definite predetermined range with a period which is long compared to the period of the said trigger pulses, first sweep circuit means for deriving from said trigger pulses a periodic series of sweep pulses and for supplying the derived sweep pulses to one ray deflector element to move the ray periodically from a normal ray position in the direction of the corresponding coordinate and thereby to describe a sweep path on the screen, second sweep circuit means for supplying to the other ray deflector element voltages which are modulated in accordance with the said control voltage to displace successive sweep paths progressively in the direction of the other coordinate, switching circuitry connected between the voltage source and a tube electrode and capable of two alternative conditions in which a tube energizing voltage and a tube blanking voltage are selectively applied to the tube electrode, said switching circuitry shifting from one condition to the other in a definite time relation to the said sweep pulses and shifting back to its original condition after a time interval which is variable in response to an applied timing voltage, and circuit means for applying to the switching circuitry a timing voltage varying with the said control voltage.

19. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and including also the pattern area controlling circuit means associated with the sweep circuitry and comprising, a circuit having two alternative conditions in which it applies to the tube either a ray energizing voltage or a ray blanking voltage and adapted on pulse actuation to change from one condition to the other, and a timing circuit initiated in action in timed relation to the voltage pulses of the sweep circuitry, said timing circuit including a settable time control and acting to deliver actuating pulses to the alternative-condition circuit at the ends of set time periods after the timing initiation, switching means for controlling the said pattern area controlling circuit means and having two alternative conditions in which the last said circuit means are selectively either energized or disabled, and control means for shifting the last said switching means between its alternative conditions in synchronism with the said periodic shifting of the first said control means.

20. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and including also pattern area controlling circuit means associated with the sweep circuitry and comprising, a circuit having two alternative conditions in which it applies to the tube either a ray energizing voltage or a ray blanking voltage and adapted on pulse actuation to change from one condition to the other, and a timing circuit initiated in action in timed relation to the voltage pulses of the sweep circuitry, said timing circuit including a settable time control and acting to deliver actuating pulses to the alternative-condition circuit at the ends of set time periods after the timing initiation, switchable circuit means controllingly associated with the timing circuit and selectively controlled in action by either of the two said control voltages and acting to set the settable time control of the timing circuit selectively in accordance with either one or other of the control voltages.

21. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to display successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages, and also including pattern area controlling circuit associated with the sweep circuitry and comprising, a circuit having two alternative conditions in which it applies to the tube either a ray energizing voltage or a ray blanking voltage and adapted on pulse actuation to change from one condition to the other, and timing circuitry initiated in action in timed relation to the voltage pulses of the sweep circuitry, said timing circuitry including two switchable and individually settable time controls and acting to deliver actuating pulses to the alternative-condition circuit at the ends of either of two time periods after the timing initiation, and switching means for said time controls operated in synchronism with the first mentioned control means.

22. A multiple display system of the electronic type as defined in claim 21, and also including: circuit means controllingly associated with the two switching time controls and controlled in action by the two said control voltages and acting to set the two settable time controls of the timing circuitry respectively in accordance with the two control voltages.

23. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and also including pattern area controlling means comprising a switching circuit having two alternative conditions, and acting by virtue of a shift between the two said conditions to shift the tube between alternative conditions of relative ray energization and ray blanking, said switching circuit being adapted to shift on pulse actuation from one condition to the other and to shift back to its original condition after a time which varies in accordance with an applied timing voltage, means for applying to the switching circuit a series of actuating pulses in definite time relation to the first said series of voltage pulses, switchable circuit means having two alternative conditions in which a voltage derived selectively from either one or other of the said control voltages is applied as timing voltage to the switching circuit, and control means actuated in synchronism with the first said control means and acting to shift the last said circuit means between its alternative conditions, whereby the timing voltage and the said sweep modulating voltage are both derived from the same control voltage.

24. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding coordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and including also pattern area controlling means associated with the sweep circuitry and comprising, a circuit having two alternative conditions, and acting by virtue of a shift between the two said conditions to shift the tube between alternative conditions of relative ray energization and ray blanking, timing circuitry initiated in action in timed relation to the voltage pulses of the sweep circuitry, said timing circuitry including a settable time control and acting, at the ends of set time periods after timing initiation, to shift the alternative condition circuit from one of its said conditions to the other, said timing circuitry also including switchable circuit means acting to set the settable time control selectively in accordance with either of the two said control voltages, and control means for switching the last mentioned circuit means in synchronism with the said shifting of the first said control means.

25. In a multiple display system of the electronic type, the combination of, a cathode ray tube having two ray deflector elements for determining, in response to voltage applications thereto, the respective positions of the cathode ray in two coordinates in the plane of the tube screen, circuit means for developing a periodic series of voltage pulses, first sweep circuit means for deriving from said voltage pulses a periodic series of sweep pulses and for supplying the derived sweep pulses to one ray deflector element to move the ray periodically from a normal position in the direction of the corresponding co-ordinate and thereby to describe a sweep path on the screen, second sweep circuit means for supplying to the other ray deflector element voltages which are modulated in accordance with a sweep modulating voltage to displace successive sweep paths progressively in the direction of the other coordinate, scansion circuit means for developing first and second control voltages which vary periodically in a definite mutual time relationship with respective periods which are long compared to the period of the said voltage pulses, switchable circuit means shiftable between two alternative conditions in which a voltage derived selectively from either one or other of the two control voltages is utilized as the sweep modulating voltage in the said second sweep circuit means, and control means for periodically shifting the switchable circuit means between its two alternative conditions in definite time relation to the periodic variations of the control voltages and also including pattern area controlling means comprising two timing circuits which act in response to respective applied energizing voltages, said timing circuits, when so energized, being initiated in action in timed relation to the first said voltage pulses and acting to define respective time periods from that timing initiation, switching means acting in synchronism with the said control means to apply an energizing voltage selectively to one or other of the timing circuits, and circuit means controlled by the timing circuit which is energized and acting to apply to the cathode ray tube a tube energizing voltage during a time period which is limited by the timing action of that timing circuit.

26. In a two-coordinate radar system employing two antennas with means for periodically and alternately shifting the radiated beams of one antenna in one co-ordinate and of the other antenna in the other co-ordinate, each antenna being adjustable in the co-ordinate of scansion of the other antenna, and with means for developing two scansion representing voltages which respectively vary in accordance with the scansion movements of the radiated beams; a cathode ray tube, two ray deflector elements associated with the tube and adapted respectively, by voltage applications thereto, to controllably determine the position of the cathode ray in two tube co-ordinates in the plane of the tube screen, sweep circuitry adapted to apply to at least one of the ray deflector elements a periodic series of voltage pulses to cause the ray to move periodically from a normal position in the direction of the corresponding tube co-ordinate, associated switchable circuitry adapted to selectively apply to at least the other ray deflector element two different voltages which are modulated respectively in accordance with the two varying scansion representing voltages, to selectively cause either of two different scansion displacements of the ray in the direction of the other tube co-ordinate, control means for the last mentioned circuitry, whereby the ray is caused to move alternatively in two distinct antenna controlled scansion patterns in the plane of the tube screen, and circuit means for modifying the intensity of the cathode ray at the tube screen at points of each scansion pattern for which the scansion position of the pattern controlling antenna bears a predetermined relationship to the adjustment position of the other antenna.

27. A two-coordinate radar system as defined in claim 26, and in which the last mentioned circuit means includes means for developing two voltages which respectively vary with and represent the adjustment movements of the two antennas, and circuitry for comparing the adjustment representing voltage of each antenna with the scansion representing voltage of the other antenna and means for modifying the intensity of the cathode ray at the tube screen when the two compared voltages have a predetermined relationship.

28. In a two-coordinate radar system employing two antennas with means for periodically and alternately shifting the radiated beams of one antenna in one co-ordinate and of the other antenna in the other co-ordinate, the said one antenna being adjustable in the co-ordinate of scansion of the other antenna, and with means for developing voltages which vary in accordance with the alternating scansion movements of the radiated beams; a cathode ray tube, two ray deflector elements associated with the tube and adapted respectively, by voltage applications thereto, to controllably determine the position of the cathode ray in two co-ordinates in the plane of the tube screen, sweep circuitry adapted to apply to both ray deflector elements a periodic series of voltage pulses to cause the ray to periodically move from a normal position in the direction of one or both of the co-ordinates, depending on the relative amplitudes of the pulses applied to the two deflector elements, circuitry adapted to modulate the series of voltage pulses applied to at least one of the ray deflector elements to vary the amplitudes of succeeding voltage pulses in accordance with the varying scansion-representing voltages, to move the ray alternately in two scansion patterns which correspond respectively to the alternating scansion movements of the two antennas, means for developing a voltage which varies with and represents the adjustment movement of the said one antenna, circuit means for comparing the voltage representing the scansion movement of the said other antenna with the voltage representing the adjustment movement of the one antenna, and means for modifying the intensity of the cathode ray at the tube screen in response to the two compared voltages having a predetermined relationship.

29. In a two-coordinate radar system employing two antennas with means for periodically and alternately shifting the radiated beams of one antenna in one coordinate and of the other antenna in the other coordinate, each antenna being adjustable in the coordinate of scansion of the other antenna; means for developing two scansion representing voltages which respectively vary in accordance with the scansion movements of the radiated beams, means for developing two adjustment representing voltages which respectively vary in accordance with the position of adjustment of each antenna, a cathode ray tube, a circuit and electrodes for energizing the tube to project its cathode ray, two ray deflector elements associated with the tube and adapted respectively, by voltage applications thereto, to controllably determine the position of the cathode ray in two tube coordinates in the plane of the tube screen, sweep circuitry adapted to apply to at least one of the ray deflector elements a periodic series of voltage pulses to cause the ray to move periodically from a normal position in the direction of the corresponding tube coordinate, switchable circuitry adapted to selectively apply to at least the other ray deflector element two different voltages which are modulated respectively in accordance with the two varying scansion representing voltages, to selectively cause either of two different scansion displacements of the ray in the direction of the other tube coordinate, control means for the last mentioned circuitry, whereby the ray is caused to move alternatively in two distinct antenna controlled scansion pattern in the plane of the tube screen, comparison circuit means responsive to the relative values of two comparison voltages and acting, by virtue of those voltages having a predetermined relationship, to vary the voltage applied to a tube electrode and thereby to modify the intensity of the cathode ray at the tube screen, switchable circuit means capable of two alternative conditions in each of which two voltages are utilized as comparison voltages by the comparison circuit means, those voltages being derived from the scansion representing voltage of one antenna and the adjustment representing voltage of the other antenna when the switchable circuit means is in one condition, and being derived from the adjustment representing voltage of the said one antenna and the scansion representing voltage of the other antenna when the switchable circuit means is in the other condition, and control means actuated in synchronism with the first said control means and acting to shift the switchable circuit means between its alternative conditions.

30. In a two-coordinate radar system of the type employing antenna means for directed radar beam radiation and for varying the direction of beam radiation to produce periodic scansion movements of the beam alternately in two scansion coordinates, the direction of beam radiation being adjustable in one of the said coordinates during scansion in the other coordinate; a cathode ray tube having electrodes for energizing the tube to project its cathode ray and having two ray deflector elements for determining, in response to voltage applications thereto, the position of the cathode ray in the plane of the tube screen, sweep circuit means for developing two alternating sets of voltage pulses which vary respectively in accordance with the position of the radiated beam in its alternating scansion movements in the two scansion coordinates, and for applying said pulses to the tube deflector elements to move the ray in the plane of the tube screen in two alternating scansion patterns which represent the respective scansion movements of the radiated beam in the two scansion coordinates, means for developing for the said one scansion coordinate a difference representing voltage which varies in accordance with the difference between the scansion position of the beam in that coordinate and the adjustment position in that coordinate to which the beam scansion in the other coordinate is adjusted, and means acting in response to that difference representing voltage attaining a predetermined condition to apply to one of the said tube electrodes a ray intensity modulating voltage.

31. In a two coordinate radar system of the type employing antenna means for directed radar beam radiation and for varying the direction of beam radiation to produce periodic scansion movements of the beam alternately in two scansion coordinates, the direction of the beam being adjustable in each of the said coordinates during scansion in the other coordinate; a cathode ray tube having electrodes for energizing the tube to project its cathode ray and having two ray deflector elements for determining, in response to voltage applications thereto, the position of the cathode ray in the plane of the tube screen, sweep circuit means for developing two alternating sets of voltage pulses which vary respectively in accordance with the position of the radiated beam in its alternating scansion movements in the two scansion coordinates, and for applying said pulses to the tube deflector elements to move the ray in the plane of the tube screen in two alternating scansion patterns which represent the respective scansion movements of the radiated beam in the two scansion coordinates, means for developing for each scansion coordinate a scansion representing voltage and an adjustment representing voltage which vary respectively in accordance with the scansion position of the beam and with the adjustment position in that coordinate to which the beam scansion in the other coordinate its adjusted, means for comparing the said scansion and adjustment representing voltages for the scansion coordinate in which the beam is scanning, and means acting under control of the last said means to apply to one of the said tube electrodes a ray intensity modulating voltage in response to the compared voltages attaining a predetermined relationship.

32. In a two coordinate radar system of the type employing antenna means for directed radar beam radiation and for varying the direction of beam radiation to produce periodic scansion movements of the beam alternately in two scansion coordinates, the direction of the beam being adjustable in each of the said coordinates during scansion in the other coordinate; a cathode ray tube having electrodes for energizing the tube to project its cathode ray and having two ray deflector elements for determining, in response to voltage applications thereto, the position of the cathode ray in the plane of the tube screen, sweep circuit means for developing two alternating sets of voltage pulses which vary respectively in accordance with the position of the radiated beam in its alternating scansion movements in the two scansion coordinates, and for applying said pulses to the tube deflector elements to move the ray in the plane of the tube screen in two alternating scansion patterns which represent the respective scansion movements of the radiated beam in the two scansion coordinates, means for developing for each scansion coordinate a scansion representing voltage and an adjustment representing voltage which vary respectively in accordance with the scansion position of the beam and with the adjustment position in that coordinate to which the beam scansion in the other coordinate is adjusted, comparison circuit means responsive to the relative values of two comparison voltages and acting, by virtue of those voltages having a predetermined relationship, to apply to one of the tube electrodes a ray intensity modulating voltage, switching circuit means capable of two alternative conditions in which the scansion representing voltage and the adjustment representing voltage for the respective scansion coordinates are selectively utilized as comparison voltages in the said comparison circuit means, and control means for the switching means acting to shift it between its said conditions in such timed relation to the scansion movements of the radiated beam that the comparison voltages correspond to the coordinate in which the beam is scanning.

HOMER G. TASKER.
ALVIN L. HIEBERT.
ALWYN L. KELSEY.
WILLIAM E. OSBORNE.

References Cited in the file of this patent

UNITED STATES PATENTS

| Number | Name | Date |
|---|---|---|
| 2,189,549 | Hershberger | Feb. 6, 1940 |
| 2,405,231 | Newhouse | Aug. 6, 1946 |
| 2,405,238 | Seeley | Aug. 6, 1946 |
| 2,408,050 | De Rosa | Sept. 24, 1946 |
| 2,416,088 | Deerhake | Feb. 18, 1947 |
| 2,418,143 | Stodola | Apr. 1, 1947 |
| 2,421,747 | Englehardt | June 10, 1947 |
| 2,422,204 | Mecham | June 17, 1947 |
| 2,422,361 | Miller | June 17, 1947 |
| 2,422,295 | Eaton | June 17, 1947 |
| 2,426,979 | Ayres | Sept. 9, 1947 |
| 2,430,292 | Hershberger | Nov. 4, 1947 |
| 2,459,481 | Wolff | Jan. 18, 1949 |
| 2,471,264 | Doherty | May 24, 1949 |
| 2,463,529 | Ferrill | Mar. 8, 1949 |
| 2,470,939 | Miller | May 24, 1949 |
| 2,480,068 | Wolff | Aug. 23, 1949 |
| 2,480,208 | Alverez | Aug. 30, 1949 |
| 2,483,644 | Kelsey et al. | Oct. 4, 1949 |
| 2,488,136 | Miller | Nov. 15, 1949 |
| 2,514,617 | Albersheim | July 11, 1950 |
| 2,540,121 | Jenks | Feb. 6, 1951 |
| 2,566,332 | Huber et al. | Sept. 4, 1951 |
| 2,570,251 | Lester | Oct. 9, 1951 |